March 24, 1970 W. H. COULTER ET AL 3,502,974

SIGNAL MODULATED APPARATUS FOR GENERATING AND DETECTING RESISTIVE AND REACTIVE CHANGES IN A MODULATED CURRENT PATH FOR PARTICLE CLASSIFICATION AND ANALYSIS

Filed May 23, 1966 9 Sheets-Sheet 1

INVENTORS
WALLACE H. COULTER
WALTER R. HOGG
BY Silverman + Cass
ATTORNEYS

INVENTORS
WALLACE H. COULTER
WALTER R. HOGG
BY Silverman & Cass
ATTORNEYS

INVENTORS
WALLACE H. COULTER
BY WALTER R. HOGG
Silverman + Cass
ATTORNEYS

INVENTORS
WALLACE H. COULTER
BY WALTER R. HOGG
Silverman & Cass
ATTORNEYS

INVENTORS
WALLACE H. COULTER
WALTER R. HOGG
BY
Silverman & Cass
ATTORNEYS

INVENTORS
WALLACE H. COULTER
WALTER R. HOGG
BY Silverman & Cass
ATTORNEYS

INVENTORS
WALLACE H. COULTER
BY WALTER R. HOGG
Silverman & Cass
ATTORNEYS

March 24, 1970 W. H. COULTER ET AL 3,502,974

SIGNAL MODULATED APPARATUS FOR GENERATING AND DETECTING RESISTIVE AND REACTIVE CHANGES IN A MODULATED CURRENT PATH FOR PARTICLE CLASSIFICATION AND ANALYSIS

Filed May 23, 1966 9 Sheets-Sheet 8

INVENTORS
WALLACE H. COULTER
BY WALTER R. HOGG
Silverman & Cass
ATTORNEYS

March 24, 1970 W. H. COULTER ET AL 3,502,974

SIGNAL MODULATED APPARATUS FOR GENERATING AND DETECTING RESISTIVE AND REACTIVE CHANGES IN A MODULATED CURRENT PATH FOR PARTICLE CLASSIFICATION AND ANALYSIS

Filed May 23, 1966 9 Sheets-Sheet 9

INVENTORS
WALLACE H. COULTER
WALTER R. HOGG

BY Silverman & Cass

ATTORNEYS

United States Patent Office 3,502,974

Patented Mar. 24, 1970

3,502,974

SIGNAL MODULATED APPARATUS FOR GENERATING AND DETECTING RESISTIVE AND REACTIVE CHANGES IN A MODULATED CURRENT PATH FOR PARTICLE CLASSIFICATION AND ANALYSIS

Wallace H. Coulter, Miami Springs, and Walter R. Hogo, Hialeah, Fla., assignors to Coulter Electronics, Inc., Hialeah, Fla., a corporation of Illinois Filed May 23, 1966, Ser. No. 552,232

Int. Cl. G01n *27/00, 27/02*

U.S. Cl. 324—71 66 Claims

ABSTRACT OF THE DISCLOSURE

Particle analysis apparatus for responding to the passage of fluid suspended particles through a microscopic path by generating and detecting signals as a result of such passage. The signals are related to electric current changes caused in the path due to the passage of the particles, and these changes primarily comprise resistive and reactive current components which reflect physical characteristics of the particles. The current in the path is provided by current excitation means of at least radio frequency and preferably in combination with another different frequency; however, any two different frequencies are adequate so that he signals are separable from one another because of their location in the frequency spectrum and/or their phase relationship. At least two resulting signals are derived for each particle and are capable of being used to ascertain more than one physical characteristic of each particle, so that even particles of identical size but of different substance would be separately detectable.

This invention relates generally to particle analyzing apparatus and more particularly is concerned with apparatus in which studies may be made of particulate systems using the so-called Coulter sensing principle in a manner to obtain more information than heretofore achieved.

This invention contemplates improvements over prior apparatus which is now in use universally for particle analysis in which classification of particles is done on the basis of relative size only. Such prior apparatus and the Coulter sensing principle are disclosed in U.S. Patent 2,656,508 issued Oct. 20, 1953, to Wallace H. Coulter, one of the applicants herein. Even with the limited information heretofore obtainable, the presently available Coulter apparatus has been accepted in laboratories throughout the world as a valuable research tool in addition to its use as means for routine counting, sizing and classifying particles. As will be seen from the discussion which follows, the invention herein substantially extends the scope of application of the Coulter principle and provides apparatus of much greater versatility and utility than the Coulter aparatus which has been commercially available. This broad accomplishment forms one of the most important objects of the invention.

Although disclosed in the above-mentioned patent and in many papers appearing in scientific and industrial journals and books, it will be useful briefly to describe the Coulter principle and point out the limited use to which the same has been put in apparatus available until the advent of the present invention.

According ot the Coulter principle, when a particle of microscopic size is passed through an electrical field of small dimensions of an order approaching those of the particle, there will be a momentary change in the electric impedance in the ambit of the field. In the thousands of commercial instruments based upon this principle, which have been made available for more than a decade, the change due to the passage of the particle is almost entirely a function of particle size for most all biological and industrial particles.

In most commercial apparatus constructed in accordance with said Patent 2,656,508 field excitation has been supplied by means of unidirectional or low frequency sources. The changes referred to in such equipment are limited to those which have a relationship with the particles causing said changes identified as based upon the size of the particles only. Such relationship has been found to be one of proportionality quite closely, that is to say, the electrical change caused by the passage of a particle through an electrical field of small dimensions excited by a direct or low frequency current is closely proportional to the size or volume of the particle. A direct current is considered to be of zero frequency in this application.

Accordingly, in such commercial apparatus, particulate systems are passed through these fields in order to produce the electrical changes related to the impedance characteristics due to the different sizes of the particles, the changes are detected by some suitable means and used to operate counters and analyzers. The analyzers associated with such apparatus classify and size particles into populations, record the data obtained, etc.

As understood from the description above, the only characteristic of particles which affected the electrical changes produced each time one of the particles passed through the electric field was almost invariably its size, this use of the Coulter principle being limited to one in which the field was provided by a direct current source. This situation would obtain in the case of low frequency sources as well, since at low frequencies the reactances of capacitive changes are so large they are in most instances effectively short-circuited by the resistances involved. The reactive effect of the particle, if any, which is due to the difference in dielectric characteristics between the particle and suspending fluid would not be manifest until the frequency of the field is high enough to cause the reactance due to the composition or material of the particle to be appreciable, that is, measurably small of its resistance.

The invention differs from the prior art in that through its teachings the capabilities of the Coulter principle have been materially expanded to provide information concerning particles being studied not limited only to characteristics due to the size of the particles, but including characteristics due to the composition and nature of the material constituting the particles. As will be seen through the discussion which follows, the first, but by no means the only, advantage which occurs to one in this art, is that it is a relatively simple matter to construct apparatus capable of distinguishing between particles of the identical size but made of different materials. In the case of the commercially known Coulter apparatus, the same electrical change will occur in the electrical field through which pass two particles of the identical size but of different materials.

The basic concept of this invention is to provide structure which will produce at least two signals as a result of the passage of a single particle through the sensing zone of a Coulter apparatus, these signals being of a nature which enables their differentiation by some means. These signals, by whatever means produced, comprise a more complete identification of the particle than previously possible. Recall that previous identification was limited to size information, and thus classification techniques were based upon size information only.

Since the "signature" of a particle can accordingly be written by the particle with greater detail, it is feasible to classify particles in a particulate system on the basis of composition alone, if desired. Information on size or number may be obtained simultaneously. By techniques to be described, signals may be collated, that is, compared, subtracted from one another, adjusted to cancel portions of one another to provide remainders, combined to produce ratio signals, etc. Unwanted signals such as noise may be dropped out, certain kinds of signals representing a particular composition of particles may be selected from a conglomerate, and classified and/or counted, to the exclusion of others, even where such others are of the same order of size.

The invention is based upon the discovery touched upon above, that when particles are being passed relative to a sensing zone of the Coulter type, that is, the particles are in suspension and an electric current path of small dimensions has been established in the sensing zone, if the current is of sufficiently high frequency, the electrical charges in the sensing zone which are produced by the passage of particles are functions, not only of size, but of their other physical properties as well. In other words, for a single high frequency, there may be two detectable changes, each due to different characteristics of the particles. Although all changes are functions of particle size, the phase angle of the impedance change will usually be different for different types of particles. "Size" as measured by resistive change will be distinct from "size" as measured by capacitive change. "Size" as measured at radio frequency will usually be different from "size" as measured at low or zero frequency; the difference is a measure of electrical transparency or opacity of the particles. The practical aspect of this discovery is that the particles may be characterized and classified on the basis of their size and other electrically responsive properties. This somewhat simplified explanation will be detailed hereinafter, but will suffice at this point.

For simplicity of design and directness of calibration, it is usually preferable to employ DC or other low frequency excitation for the purpose of obtaining size information in order to classify or segregate particles on a basis of qualities other than size. However, this is not always necessary. For instance, many different kinds of particles will have ratios of transparencies at two well separated radio frequencies which are quite different from the ratios of transparencies of other particles at the same frequencies.

An important object of this invention is to provide apparatus to take advantage of this discovery for classifying and analyzing particle systems.

The design of structures to utilize the concept stated above may take several forms, the most basic of which will be described in detail in the specification which follows, but which will be pointed out here.

One structure could take the form of apparatus in which the source of current for the electrical path relative to which the particles are moved is a source of radio frequency energy. The changes which are produced from such apparatus could be separated on the basis of phase difference into two components of characteristic amplitudes. If several frequency components are present in the sensing zone energizing current, even more of these components may be isolated by virtue of their different frequencies as well as phase. At any given radio frequency, one of the two components separable by phase difference may be produced primarily by the reactive effect of the material from which the particle is made and the other is produced primarily by the resistive effect of the material from which the particle is made. Thus more data is obtained for each particle passage. Operating on the resultant of the two components without attempt at separation will provide a low grade of information, not more than that obtained through an application of the Coulter principle to sizing based upon the use of a direct current or low frequency source, but in most cases, less because of the adulteration of the size information by unknown factors.

Another structure could take the form of a pair of sources, both of which are applied to the sensing zone simultaneously, one being radio frequency and the other being direct current "zero frequency" or of sufficiently low frequency that the reactive part of the "particle impedance" has negligible effect on the response of the apparatus. In such case, the two sources each produce identifiable effects when the particles move relative to the sensing zone, one being almost purely due to the size of the particles, and the other being due not only to the size, but to the resultant of the size, resistive and reactive effects. The resistive and reactive effects are in turn an indication of the nature of the particulate material and the way it is distributed in the particle. If the changes due to the radio frequency source are further analyzed into the two components producing them, namely primarily resistive and primarily reactive, even more information can be obtained by the apparatus.

Still another form of the apparatus may be one in which there are two radio frequency sources of different frequency, either with or without an additional source in the form of a direct current or low frequency source. In such case, there are four or five output signals capable of being derived from the apparatus, which will quite fully identify the particle and enable its classification upon many different bases.

The invention has as additional objects the provision of apparatus of the types mentioned briefly above.

The forms of the apparatus which have been described above obtained additional usefulness through the manners in which the classification and analysis of the particles are carried out. The primary means for apparatus of the invention is the means for separating the responses, and as mentioned above, these may function on the basis of differences in transparency, frequency, phase angle, or relaxation constant, etc., singly or in some combination.

The invention therefore obtains information of particles for use in study, analysis and classification, regarding their dielectric constants, resistivities and the phase angles of signals produced in response to passing a current through and/or around the particles. The detection of changes in current is feasible in accordance with the invention even where the changes are of the order of as little as one millionth of the steady state current in the sensing zone, this being likewise a characteristic of the Coulter apparatus as generally used. In the latter case the change was one of the resistivity of the total sensing zone caused by the presence of a particle. In the present case, the changes are more complex, but in addition, signals due to capacitive changes may be appreciably less than the resistive changes, so that it is essential that the structure for separation of the components and analysis of the resulting current in the sensing zone take this fact into consideration.

A great deal of the efficacy of the invention depends upon achieving the separation of changes in the sensing zone into components providing even further dimensions in particle classification. This end is obtained primarily by the principle of separation and the structure used to accomplish the same, but additional structure is taught herein which provides even better results. Without going into this at length, it may be said that two factors which may confuse the results are finite impedance of the source or sources and the reactive effect of the sensing zone itself upon the resulting signals. In the first case the invention contemplates structure which will render the source or sources of high or substantially infinite impedance, and in the second case the invention contemplates tuning the sensing zone by some means to render the same anti-resonant at the frequencies used, so that its reactance will not affect the phase of current changes caused by passage of particles.

Another aspect of the invention is concerned with operating upon the outputs which are obtained. As seen hereinafter, such operation is accomplished by structure for subtracting, obtaining ratios, comparing and otherwise reducing the information obtained to the form which is best desired for the purposes needed.

In order to enable a fuller appreciation of the invention before describing the details thereof, a discussion of the significance of the invention is believed to be in order. This, although of a nature which might readily be derived from the description of the preferred embodiments, should aid in a better understanding of the same.

Along with expanding technologies in many fields there exists a need for additional means of particle analysis beyond what is presently available. This is especially true in biology where analyzing and classifying of cells occupies a considerable amount of attention today.

Biological cells are commonly suspended in aqueous electrolytes and their composition is normally such that they behave as good insulators in such electrolytes. The composition of such cells, i.e., the substance from which their interiors are formed and their shell thickness, have little if any effect upon the amplitude of the current changes produced when a cell passes through a sensing zone having an exciting source of direct current or a current of low frequency. Increasing the frequency of the source causes the cells to pass increasing amounts of electric current since the cell walls function as tiny capacitors, so that the change produced by the passage of such a cell through a current path of high frequency will become a function, not only of its size, but also of the material from which it is formed and the thickness of its shell or sac and its contents.

The invention thus enables signals to be obtained which are based upon size and composition as well. The signals may be separated into those representing cell size only, composition only, and signals related to both of these characteristics. The momentary change of capacitance across the sensing zone caused by the passage of a particle will obviously be affected at least by the dielectric constant of the particle itself, so that considerable information can be obtained about the cells.

Simultaneous production of two or more pulses caused by the passage of a single particle through a sensing zone provides a tool for eliminating or at least minimizing the masking effect of particle size upon the pulses, thereby giving information which is practically exclusively related to composition alone. For example, one signal may be the pulse signal of the "Coulter Counter," as the Coulter apparatus is commercially known today, which is closely related to size only, and the other may be a pulse simultaneously derived from apparatus constructed in accordance with the invention, in which said pulse is a demodulated product of a radio frequency sensing zone current of perhaps equal intensity applied simultaneously to the sensing zone along with the direct current. With red bloodcells, for instance, if the radio frequency current is of sufficiently high frequency the pulse produced after simple amplitude demodulation will be only a small fraction of the amplitude of the component attributable to the pulse by the change in the direct current caused by passage of the particle. This fact, that is, the lower intensity of pulse, is caused in biological cells because the radio frequency current of the sensing zone is modulated at a much lower degree than the change in the direct current component, and in turn this is caused by reason of the fact that biological cells become increasingly "transparent" to passage of electric current with increased frequency.

For a given type of particle, the signal due to the direct current source and that due to the radio frequency source are both proportional to the size of the particle. Hence by attenuating the signal due to the direct current source or amplifying the signal due to the radio frequency source, until the direct current caused pulse is substantially equal to the simultaneously produced radio frequency caused pulse, and substracting one from the other, the difference signal is small or zero regardless of particle size. However, for other types of particles which have different transparency to the radio frequency sensing zone current, this equality does not hold, resulting in a response from these particles in the difference signals. In this manner, the apparatus may be constructed to ignore particles of certain types and respond to others. By adjusting the relative gains in each of several pairs of electronic channels, each of several types of particles may be selectively ignored, and by repeating the process appartus may be constructed which responds to only one type of particle in a suspension of several types, and so forth.

Several different types of particulate systems may be considered for classification techniques, according to the invention. Systems with several different compositions of particles would be mixtures of red blood cells and polystyrene, mixtures of blood cells and fat particles in milk, mixtures of different kinds of biological particles in the same suspension and the like. The particles of each system have different internal impedances, to radio frequency, and hence will produce different modulations of the radio frequency current compared with one another and compared with their respective effects upon the direct current of the source, if one is used. It is immaterial that the particles of any given system fall within the same size range, and it is believed that there was no known method of classification or analysis of such particulate systems, prior to this invention. In the case of the mixture of the polystyrene particles and blood, the concentration of the polystyrene particles may be known and their size range may be accurately controlled to a very narrow band so that the pulse information from these particles may be used to monitor the system continuously and even to provide corrections automatically to ensure that the red cell count and/or size distribution is correct. Any change of sensitivity of the sensing zone due to presence of debris may readily be detected and/or corrected for.

Industrial particulate systems are also capable of being more thoroughly studied with the invention. For example, growing industrial fields are contamination, pollution and the like. These fields require the study of particulate systems in which multiple compositions of particles are present. Still another field especially susceptible to the techniques of the invention is that involving particles in which relatively stable shells have materials which are not as stable, encapsulated within the shells. Shell thickness being an important consideration, the invention provides a tool not heretofore available. Other examples will suggest themselves.

Unwanted signals can be eliminated through the use of the invention, whether they be signals representing information on size or other characteristics, or noise. A signal from a particular particle or cell type which produces a different modulation effect upon two different channels enables combining the channels to eliminate the interference or noise which shows up in both channels. One channel interference or noise is arranged to have polarity opposite to the interference or noise in the other channel after which simple addition cancels the interference or noise in the summation channel.

Many other advantages and uses of the invention will become apparent with the explanation which follows. Likewise, the objects of the invention cover a wide range of desired structures and results which are achieved and are capable of achievement by the invention. No useful purpose will be served in a catalog of such objects additional to those generally set forth above, and those which naturally flow or are implied from the invention. The scope of the invention will suggest itself to those skilled in the art from the specification and the appended claims.

The drawings which are attached are for the most part diagrammatic in nature since the invention is explained through the use of symbols and blocks as well as some circuitry in order to present the description in a broad and clearly understood aspect. Those skilled in this art will comprehend the nature of the electronic circuitry from the designations applied to the blocks or from the circuit diagrams used, without the need for further detail.

It should be borne in mind throughout that the structures described and illustrated are only exemplary.

The invention, as previously indicated, is based upon a fundamental concept not appreciated until now, or if appreciated, not applied to useful ends. The redistribution of electric flux and/or current through and/or around a particle which distorts the electric field causes changes in the quiescent energy relationships due to the transient change in the way heat is produced and energy is stored in the field. These changes in energy relationships are different for different frequencies and particle size, composition and topology and are reflected in the impedance seen at the aperture electrode terminals as changes of resistance and capacitance, respectively. This being so, the aperture impedance may be represented by an equivalent circuit comprising combinations of one or more resistances and capacitances, and in which a local combination of resistance and capacity is replaced by another combination of resistance and capacity which represents a cell or particle. In order to be acceptably valid for all frequencies, such equivalent circuit may be quite complicated, but, at any single frequency it may be represented by a single capacitance and resistance, which values will generally be different at a different frequency. Cells or particles of a given type will generally have characteristic interrelationships of these equivalent resistances and capacitances.

Figure 1:
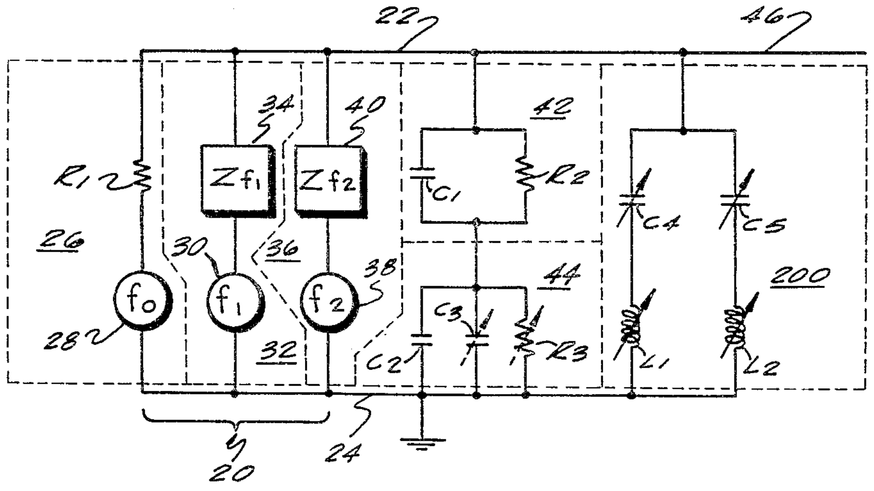
FIG. 1 is a symbol circuit diagram illustrating the equivalent electrical circuit of one form of the invention, this diagram being used to explain the theory of the invention.

In FIG. 1 there is illustrated a simple circuit which attempts to depict the nature of the particle passing through a Coulter type sensing zone in which the current source means is comprised of three different components, one being a frequency $f1$, the second being a frequency $f2$ and the third being a frequency $f0$. The source of frequency $f0$ is direct current "zero frequency" or of such low frequency that the reactive effects upon the circuit are of no consequence, and the other two are of different radio frequencies causing finite effects upon the circuit.

The three sources are designated generally 20, these being considered together as the current source means for the sensing zone. The sources are all connected between the line 22 and the common connection 24, which is shown grounded. The current source 26 is represented by a constant potential source 28 and a series resistor R1 which is the internal resistance of the source 26. As a result of this structure there will be a steady state direct current flowing in the line 22.

The first radio frequency source 32 is represented by an oscillator 30 of frequency $f1$ and a series impedance 34 of $Zf1$ ohms, also connected as shown between 22 and 24. The contribution of this source will be a current in the line 22 of high frequency $f1$.

The second radio frequency source 36 is represented by an oscillator 38 of frequency $f2$, different than the frequency $f1$ and a series impedance 40 of $Zf2$ ohms, connected between 22 and 24. The contribution of this source will be a current in line 22 of high frequency $f2$.

It will be appreciated that the equivalent circuit being described in FIG. 1 is more complex than the most basic structure contemplated by the invention, as defined in the claims, but this is being done to provide a broad consideration of the invention and its ramifications. The basic structure of the invention utilizes one or more of the sources in such an arrangement that two different kinds of output signals can be achieved, and this will be explained below.

Continuing with the explanation of the circuit of FIG. 1, the frequencies $f1$ and $f2$ could be any suitable different frequencies in the radio spectrum and even higher, such as for example 3 megacycles per second and 10 megacycles per second and including frequencies beyond hundreds of megacycles per second. The nature of the circuit components, economy and other factors will control, along with the known reaction of the particulate system being studied to different frequencies.

The networks 42 and 44 which are connected across the lines 22 and 24 represent the equivalent circuit of the sensing zone and its sensing means. This circuitry is not intended to be limiting, but is primarily illustrated in this manner to show the complexity of the signal at the output 46 and because it is easily related to structure which perhaps is familiar to those skilled in this art. In the Coulter Counter, there might be a beaker containing a body of fluid within which the particles being studied are suspended. A closed liquid system, including what has become known as an aperture tube having a microscopic aperture adjacent the bottom thereof, is established with the body of fluid in the beaker by immersing the bottom end of the aperture tube in the body of fluid in the beaker. The remainder of the closed liquid system is formed by a second body of fluid within the aperture tube. The only connection between the bodies of fluid physically is through the microscopic aperture in the wall of the aperture tube, and likewise the only D.C. electrical connection between them is also through the aperture. An electrode, usually platinum, is immersed in or coupled with each body of fluid, and hence there is one in the beaker and one in the aperture tube. The current source is connected to the electrodes by means of electrical conductors which extend from the beaker and tube, and likewise the detecting means are connected to the electrodes by means of electrical conductors which extend from the beaker and tube. The electrodes are the sensing means, together with their connections to the exterior of the tube and beaker, and the electrical changes will occur within the effective confines of the aperture where the current density is the greatest of the electrical circuit involved. Such changes are produced in this particular form of apparatus as a result of moving the suspension from one body of fluid to the other through the aperture, this movement causing particles to pass through the aperture at a high speed. These changes will be manifest as changes from the steady state current conditions existing in the aperture when no particles are present, and they are detectable at the exterior terminals of the electrodes, as for example across the lines 22 and 24 in FIG. 1, appearing as a composite electrical phenomenon at 46.

The aperture is usually formed in this structure as a sapphire wafer, cemented, fused or otherwise mounted in a suitable opening in the tube wall.

Means normally are provided to drive the fluid through the aperture, or through the sensing zone, as for example, by pumping, gravity, displacement and so on. In the figures such means will be designated generally "fluid driving means" and will be illustrated as a simple block. The means may be mechanical, hydraulic or combinations thereof. A particular structure which has been used with success in the Coulter Counter mentioned above is described in U.S. Patent 2,869,078 issued Jan. 13, 1959 to Wallace H. Coulter and Joseph R. Coulter, Jr., the former being an applicant herein.

It is to be understood that the structure being described with particularity is familiar in the are and well known, so that the explanation of the theory of operation made in connection therewith will be more readily perceived by those skilled in the art, but the invention is not limited to this structure. The invention contemplates flow-through arrangements including structures in which the electrodes are quite close to the aperture, and even structures operating on the principles described and illustrated in said U.S. Patent 2,656,508 in which the electrodes are contained wholly within or immediately adjacent the aperture, as well as sensing zones which are defined by electrodes without the use of physical apertures. It includes cases where the flow of electric current in the sensing zone is transverse of the physical fluid flow which carries the particles through the sensing zone.

Continuing with the description of the equivalent circuit, the upper network 42 comprises a resistor R2 in parallel with capacitor C1. These could represent the total series resistance and capacitance of the contents of the beaker and aperture tube from the electrodes to the aperture. It is assumed that there is no inductive effect produced by the liquid, and in all cases there is no reason to refute this assumption at the frequencies contemplated. These frequencies are in or in the vicinity of the so-called radio range of the spectrum. This network 42 is somewhat fixed, although it is subject to change of values in response to change in physical design and placement of the electrodes and vessels, as well as in response to the kind of liquid or electrolyte within which the particles are suspended. The impedance contributed by the elements R2 and C1 is typically quite small compared with that contributed by the network 44 because of the relatively enormous cross section of the connecting bodies of fluid and resulting extremely low current density, when compared with the cross section and current density in the aperture.

The lower network 44 is shown composed of the capacitive elements C2 and C3 and the resistive element R3. The condenser C2 represents the fixed shunt capacitance of the walls of the aperture tube and wafer above referred to in the region of the aperture. The capacitance C3 and the resistance R3 represent the aperture impedance, that is, the impedance of the liquid contained in the aperture. This obviously consists of a resistive part and a capacitive part without appreciable inductive reactance.

Ignoring for the moment the fact that the elements C3 and R3 are shown variable, the total current produced by all of the sources 20, regardless of how many there are, will divide between the various paths shown, resulting in a steady state current, assuming there are no variations in any of the components of the circuit as thus far described the realization of which is of course an important design objective. In this invention, as well as in the well-known Coulter apparatus, such steady state conditions produce no output signals of any kind, since as a matter of practical circuitry, the output lead 46 has a capacitive coupling therein to block any steady state direct current. Other means are used in this invention in the detectors to assure that there will be no output signals for steady state conditions due to the radio frequency.

Each time that a particle passes through the aperture or sensing zone, the circuit which will be affected is the network 44. The elements C3 and R3 will be changed momentarily, and this change is represented by the arrows through these symbols. Since the change is only momentary, the arrows are shown as broken lines, because, as soon as a particle has passed through the sensing zone, the impedance of the aperture or network 44 reverts to its value with no particle in the aperture. This recovery is accomplished at a very high speed, considering the speed at which the particles pass through, the duration of a change being of the order of 20 microseconds in the conventional Coulter apparatus. If the aperture current were purely direct current, the capacitive reactance represented by the condenser C3 generally would have no appreciable effect upon the current at the flow rates customarily used, but in the case of high frequency aperture current, the effect could be quite substantial, at least with respect to the effect caused by the equivalent resistance R3.

Given an aperture current of some frequency $f$ without the passage of a particle, the resulting steady state voltage at 46 will depend upon the effects of the finite resistive and reactive components of the current source and the rest of the aperture circuit as well as the relative and absolute magnitudes of the resistance and reactance of the liquid of the aperture. When a particle passes through the aperture and adds its own resistance and capacitive reactance momentarily to the network (or more accurately, substitutes these for those of a volume of fluid equal to the volume of the particle, displaced by the particle), it must be appreciated that the resulting output signal at 46 may well defy any attempts at precise analysis by classical methods. The invention utilizes this signal in a manner to be explained, even without compensating for other effects not due to the passage of a particle. These other effects will be described later in the specification, in connection with the remainder of the circuit of FIG. 1 which will not be referred to at this point.

If it is assumed, as will later be shown possible, that the source impedance is very high or "infinite" for all practical purposes for the frequencies employed and that the effects of the circuit elements C1, R2, and C2 may be eliminated or reduced to tolerable or vanishing importance, the change in the terminal impedance caused by energy loss due to the passage of a particle (which will be called the resistive component) will be in phase with the aperture current, and the change of the terminal impedance due to capacity effects will be 90° out of phase with the aperture current and resistive component. In this case the resistive component may be detected by means of a simple amplitude modulation type detector and the capacitive component may be detected for instance by means of a frequency modulation discriminator followed by a de-emphasis network whose output is inversely proportional to its input frequency. The use of the frequency modulation techniques is made possible by the fact that under the conditions assumed, a minute change of capacity at the terminals alters the phase of the sensing zone circuit impedance slightly. Such a change constitutes phase modulation which is a form of frequency modulation in which modulation sensitivity is proportional to modulation frequency. Of course, whether or not the assumed conditions regarding the sensing zone circuit obtain, the resistive and capacitive components may be separated by means of phase sensitive or synchronous detectors.

That certain circuitry is required in order for these idealized situations to obtain will be explained later in connection with means for improving the response from the apparatus of the invention and producing better data therefrom.

The invention is embodied in structure for producing at least two different signals from the same particle passing through a sensing zone, by means of which a better identification of the particle can be obtained than previously feasible with known apparatus.

Figure 2:
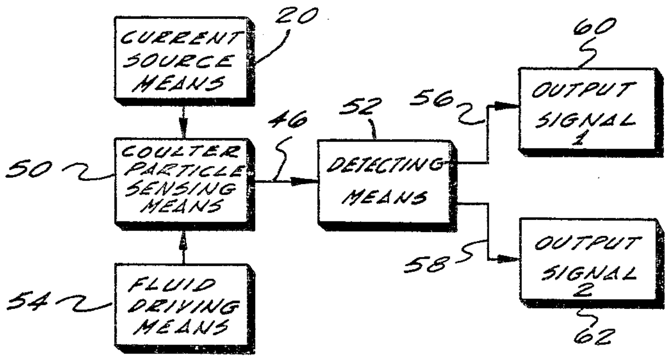
FIG. 2 is a block diagram illustrating a highly simplified form of the invention.

In FIG. 2 there is illustrated a basic structure of the invention which provides two different signals from the passage of a single particle through a sensing zone. The Coulter particle sensing means is a block designated 50 and it may take the form of an aperture system, flow-through system or the like, and will include the electrodes which were described. The current source means 20 is a block which represents some form of electrical energy, depending upon the nature of the detecting means 52. The block 54 is fluid driving means, previously defined, for moving the suspension relative to the sensing zone. Two outputs are shown at 56 and 58 operating into some means for utilizing the information contained in these signals. Such means are shown as simple blocks designated 60 and 62 and defined as output signal 1 and output signal 2. These means will take many different forms, as described later, but for the moment they may be considered electrical connections with or without some type of read-out.

The current source means 20 will always include at least one radio frequency energy source, and may include a low frequency source and/or additional radio frequency sources of different frequencies.

Any radio frequency current source which contributes to the current in the sensing zone path will produce a carrier signal during steady state, i.e., without particles in the sensing zone, and will be modulated by the passage of a particle through the current path which in turn will produce side bands. The output from the sensing means at 46 will include at least the modulated carrier of each radio frequency source.

A single radio frequency source alone which is detected by merely demodulating the signal from the sensing means will provide low grade, although perhaps useful information. Such a simple structure, in order to be of value for identification and classifications, must produce at least two signals, each of which is related to at least some different characteristic of the particle producing the same. Thus, if the detecting means 52 is capable of resolving the signal from the sensing means into primarily capacitive and primarily resistive components, there will be signals at 56 and 58 both of which are related to size and composition characteritsics of the particle. The relative magnitudes of these signals will usually vary for different types of particles.

If a single radio frequency source is used along with a low frequency source but the detecting means is not capable of separating the signal at 46 into two components so that at 56 and 58 one output is related strictly to size effects while the other is related to the conglomerate effects of size and composition, there will still be considerable usefulness in the structure. The reason for this is that the output due to the radio frequency source will be available for comparison and processing with the output due to the low frequency source. Structure for operating upon these outputs to drop out the size effects, or at least minimize the same, will provide considerable information concerning the composition of the particles passing through the sensing zone.

In the case of a single radio frequency source and a low frequency source, if the detecting means 52 is more sophisticated than a structure able to detect and separate the components due to the size of the particle and the radio frequency modulation due to the conglomerate effect of size and composition, and additionally is capable of further separating the side bands detected into their resistive and reactive components, three outputs would be available to give information concerning each particle. Classification, sizing, counting and the like are more readily and completely capable of accomplishment.

If there are two radio frequency sources and no low frequency sources, the detecting means 52 need only separate the signals at 46 into two conglomerate signal outputs at 56 and 58 for comparison and study to give considerable information.

Further, if the detecting means 52 is capable of further separating the two sets of side bands into their resistive and reactive components, there will be four outputs available for each particle passing through the sensing zone.

Adding the low frequency source to the multiple radio frequency sources gives increased information which is again especially valuable since it produces responses primarily to particle volumes only.

The above simplified examples of apparatus according to the invention assume that there may or may not be some structure for rendering the impedance of the sources substantially infinite and that there may or may not be some strutcure for tuning out the effects of the impedance of the aperture steady state circuit upon the signals resulting from the passage of particles, so that these signals are to all intents and purposes in orthogonal phase relation to one another and to their sources. The nature of such orthogonally organized signals should be pointed out.

For a given radio frequency carrier, the modulation which is caused by the passage of a particle relative to the current of small dimensions is due to reactive and resistive changes which vary with the electrical nature as well as the size of the particle. If each carrier or steady state drop across the sensing zone is orthogonally related to its corresponding frequency energizing current source, the reactive changes will cause phase and frequency modulation, and the resistive changes will cause amplitude modulation. The signal obtained by using a frequency modulation demodulator will be related primarily only to considerations of the reactive change due to the particle and its size. The signal obtained by using an amplitude modulation demodulator will be primarily a measure of the resistive change due to the particle and its size. If there is a low frequency source as well, and its signal component is completely separated from the remainder of the sensed signal, such component will be related primarily only to the size characteristics of the particle.

The above paragraph requires perhaps some additional explanation, which will make the reasons for the structure described more easily understood. The nature of the changes which are sensed must first be appreciated before describing the remaining circuits and structures illustrated.

When a particle passes relative to an electric current path of small dimensions in which the path is excited by a source of radio frequency energy, there are two basic effects which are intrinsically orthogonally related in a vector or phasor representation. One effect (resistance to current) involves energy loss caused by the infinitesimal heat change due to the particle as it traverses the field of the aperture. The other is due to a change in the ability of the contents of the sensing zone to store energy (capacitive effect (in the form of dielectric stress during the presence of the particle. There is no appreciable inductive effect in an aperture at the frequencies and impedance levels used.

If the change of sensing zone impedance is not permitted to affect the sensing zone supply current, this orthogonal relationship is most simply maintained. As indicated above, means for ensuring this is to be described later in the specification.

The principles described in the paragraph above enable apparatus to be constructed which can respond to either the loss of energy or resistive signal component, or to the storage of energy or the reactive signal component, both of which will occur when a particle passes through the sensing zone. Each of these signal components will in turn be related to the size, internal and external resistivity, dielectric constants and topological distribution of the various constituents of the particle. Furthermore, if the change of sensing zone impedance (reactive and resistive) due to the presence of a particle is not permitted to affect the sensing zone current, the resistive signal voltage component will be in phase with the sensing zone current and the reactive signal voltage component will be in quadrature with the sensing zone supply current.

Either component may be positive or negative depending, in the resistive case upon whether or not the effective resistivity of the particle exceeds that of the suspending fluid, and in the capacitive case upon whether or not the effective dielectric constant of the particle exceeds that of the suspending fluid. The situation is complicated by the fact that the displacement current flowing in one, for instance in the dielectric constant of the suspending fluid, may produce heat in the particle due to its internal resistivity, or the conducted current in a suspending electrolyte may effectively make contact to a particle which behaves like a tiny capacitor. This does not prevent capacitive and resistive components of the signal at the electrode terminals from being isolated, however, and these components constitute a "signature" which is peculiar to each type particle, in conjunction with a specified suspending fluid. Thus the resulting signals are vastly different from the signals obtained from the identical particles due to passage through a direct current (zero frequency or low frequency field.

The impedance changes which are caused by the passage of a particle through the sensing zone which is energized by a high frequency current source result in a modulated signal in the sensing zone output 46, this signal consisting of a carrier at the frequency of the radio frequency energy source due to the interaction of the aperture current with the steady state aperture impedance and sidebands caused by response to these changes. Since the information concerning the particles is contained entirely in the sidebands, the sidebands may be considered to be the useful signals. If circuit reactances are properly chosen, causing the carrier to be approximately in phase with the aperture current, the upper and lower sidebands due to reactive changes combine or heterodyne to form a resultant signal component which is substantially in quadrature with the carrier and at the carrier frequency and hence frequency and phase modulate the composite signal as sensed at the electrodes. Under these conditions, the upper and lower sidebands due to resistive changes similarly combine to form a resultant signal component which is substantially in phase with the carrier and hence amplitude modulate the composite signal as sensed at the electrodes.

The action referred to above may be more simply explained by observing that the principal effect of changing the resistance in an antiresonant circuit is to change its "Q" or figure of merit, thus changing the net impedance which is substantially resistive, whereas the principal effect of changing the reactance slightly has the effect of detuning the circuit slightly, thus changing any lead or lag in phase slightly without appreciably affecting the magnitude of the impedance. However, the introduction of the concept of sidebands should make it more clear that the various signal components are real and can be treated as any other voltages or currents.

The usefulness of the modulated signal will depend to a large extent upon the manner of separating the various components of the signal for use as identifying or controlling factors. Additionally, if a direct or low frequency source is used simultaneously, the need for separation of the components of the modulated signal is not as essential to achieve an improved utility over the prior Coulter apparatus.

Figure 3:
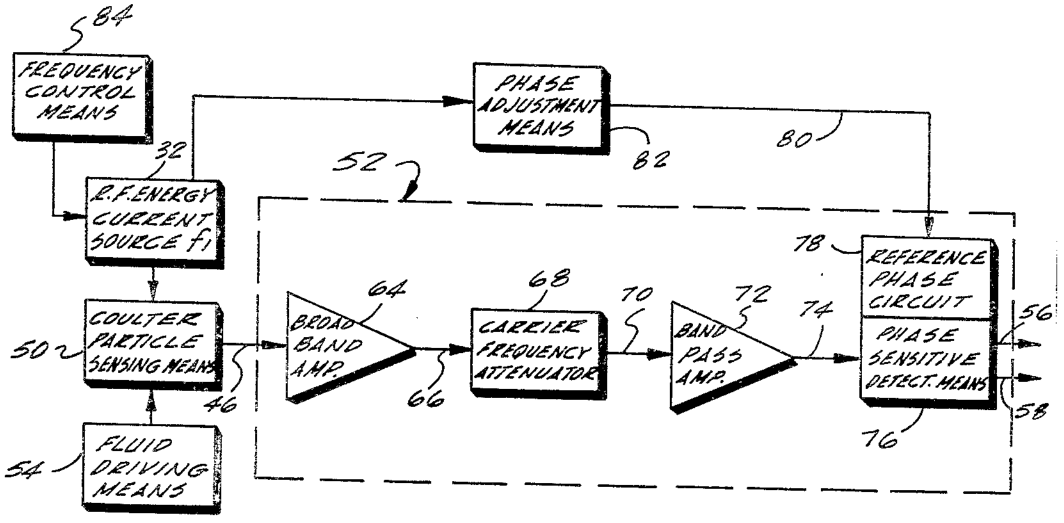
FIG. 3 is a block diagram illustrating a form of the invention in which phase sensitive detecting means are used and are related to the source of sensing zone current.

In FIG. 3 there is illustrated a simplified block diagram of apparatus which is constructed in accordance with the invention and shows a typical structure for use with a single current source of radio frequency energy. The source is shown at 32, and for ease of following the various illustrations, wherever a single radio frequency source is shown, its frequency will be referred to by the symbol $f1$ and the reference 32 although it may be of any frequency or even adjustable frequency.

The relation to the basic apparatus of FIG. 2 will be made obvious by the use of similar reference characters. The output signals at 56 and 58 are intended to provide information related respectively to the capacitive and size effects of a particle passing relative to the sensing zone, and to the resistive and size effects of the same particle passing through the zone.

The signal at 46 will be a modulated carrier of frequency $f1$ and, so long as there is no particle passing through the sensing zone, the sensing means 50 will serve merely to transmit the carrier to the detecting means 52, with no side bands. In the detecting means 52, there is included a broad band amplifier 64 whose output signal at 66 is applied to a carrier frequency attenuator 68 coupled at 70 with another amplifier 72 which is a broad band pass amplifier. The purpose of the carrier frequency attenuator is to increase the percentage modulation in order to permit higher amplification and to facilitate subsequent demodulation. Under many circumstances it may provide only moderate carrier rejection and/or it may be placed before the broad band amplifier 64 or it may be omitted entirely. It will be appreciated that since the structure of FIG. 3 does not utilize a direct current source, there is no need for electrodes to contact the suspension electrolyte so long as there is a close coupling with the sensing zone.

When a particle passes relative to the sensing zone the carrier will be modulated and side bands will appear in the signal at 46 and 66. If the carrier frequency attenuator 68 is perfectly effective, the side band signals alone will appear at 70, will be amplified in the amplifier 72 and applied at 74 to the phase sensitive detecting means 76. If not, the remanent carrier will produce only a direct current at the output of the phase sensitive detector from which superimposed signal components may easily be separated by D.C. blocking means. It may be noted in passing that the amount of modulation is extremely small, and this will be emphasized by reference to certain structure described hereinafter.

One assumption which should be made in considering the structure of FIG. 3 is that the influence of phase change of the resistance and capacitance of the sensing zone and connections upon the carrier during stead state conditions has been negligible or has been compensated for. Likewise, the finite impedance of the source 32 has not had any deleterious effects upon the signals at 46.

The broad band pass amplifier 64 is an isolating circuit of low gain capable of handling large and small signals alike. It serves to isolate the sensing means 50 from the detecting means 52, and in effect does not really perform a detecting function, although included within the large block 52. The attenuator 68 may take any form, such as for example, a notch filter which uses piezo-electric components to reject the carrier frequency in a very narrow band but with great efficiency. The carrier frequency attenuator and broad band amplifier may consist simply of a single differential amplifier with one of its inputs driven by an unmodulated voltage taken directly from the radio frequency energy source and which would be adjusted to be of the same approximate amplitude and phase as the modulated signal applied to the other input. The signal which remains after attenuating the carrier appears at 70 and because of its low energy is amplified for easier separation into its components. Likewise there may be some signals outside of the side bands which are not needed, and may have interference effects, so that the amplifier 72 processes the remanent signal 74 to eliminate frequencies which are unnecessarily produced during the passage of the particles relative to the sensing zone.

The explanation given of the theory of the invention suggested that the resistive signal voltage component produced by the change occurring when a particle passes relative to the sensing zone will be in phase with the sensing zone supply current, and the capacitive signal voltage component produced will be in quadrature with such current. Accordingly, there would be a detectable and identifiable phase difference between the signals. Phase sensitive detecting means 76 responsive to the difference in phase between the two components will enable a separation of these components. The outputs at 56 and 58 will therefore provide the two different signals related as described.

Relation to the phase of the signal current may be achieved in several ways. A reference phase circuit 78 may be provided connected to the source 32 by the connection 80. This connection or coupling could have a phase adjusting circuit in it at 82 so that the relative phase difference might be changed for investigative purposes, or for finding a condition of phase relation which gives the best separation or the best amplitude differentiation, etc. Instead of the connection 80, an artificial or locally produced phase reference circuit may be used.

In the use of the signals at 46, many different means may be utilized for study, extending from the very simple to the highly sophisticated. Some consideration will be given to these below.

One simple form would count the pulses at each output 56 and 58, since these would be in the form of pulses. A comparison of these signals could detect the presence or absence of certain kinds of particles. For example, if a physiological saline suspension were made up of particles which have very low dielectric constant, such particles will have high impedance to high frequency current and will produce changes in both output channels, so that as long as there are the same number of counts in each channel, the suspension is practically pure. If the pulses differ substantially from one another, it would mean that some new particles are present. For example, certain organic materials or cells may produce pulses in the resistive-size channel while producing no pulses or very much smaller pulses in the capacitive-size channel.

Note that there is a frequency control element 84 in FIG. 3 connected to change the frequency of the source 32. This will enable a study to be made of the response of the particles with respect to frequency. The same suspension may be passed through the sensing zone several times at different frequencies, or the source may be adjusted for any desired frequency at which it is known that optimum information can be obtained for any given kind of particles. The element 84 may enable the user to adjust the amplitude of the signal applied by the source and/or the frequency.

Figure 4:
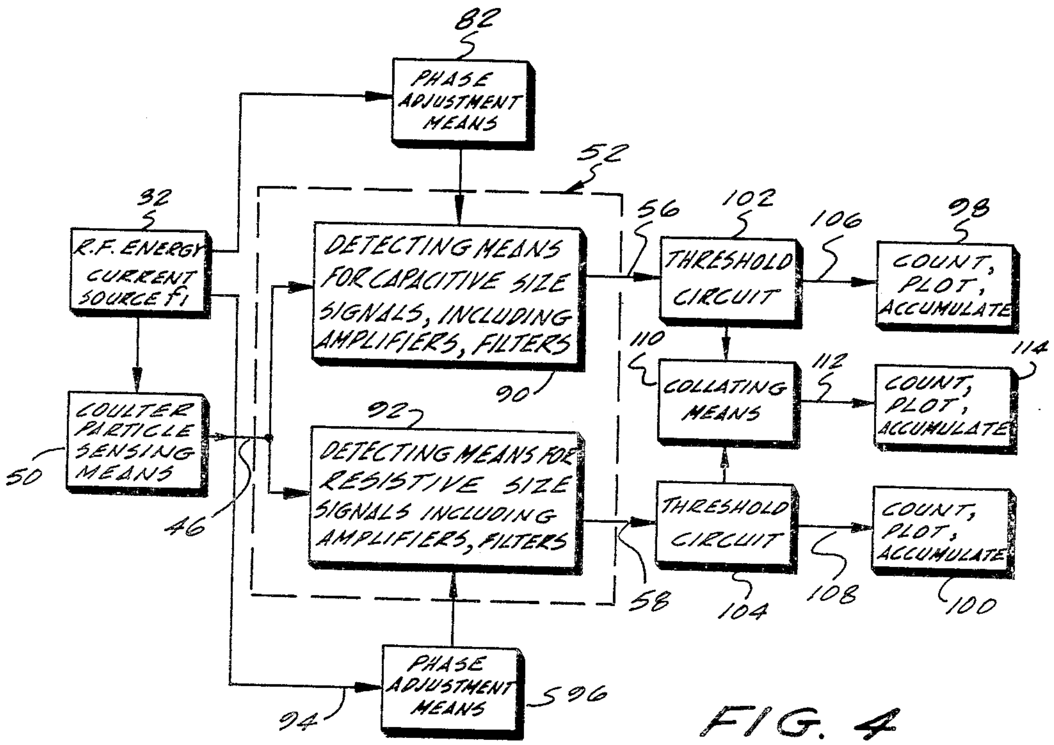
FIG. 4 is a block diagram of another form of the invention, but showing a form of utilizing information derived to classify and identify particles.

Another simplified form of the invention is shown in block diagram in FIG. 4. This structure also uses a single source of radio frequency energy 32, which may also be adjustable as to amplitude and/or frequency. The sensing means is shown at 50, and in this case the fluid driving means is not illustrated and it may be presumed present in all versions of the invention. The signal output at 46 is again applied to the detecting means 52, within which are shown two separate circuit blocks. The upper block 90 is a detecting means for capacitive-size signals and is required to reconstruct from the sidebands pulse signals, proportional to particle size, due to those changes in the sensing zone impedance which are primarily capacitive, caused by particles passing relative to the sensing zone. Thus, the output at 56 in FIG. 4 is equivalent to the output at 56 in FIGS. 2 and 3. The second block 92 is described as detecting means for resistive size signals, including amplifiers, filters, etc. This detecting circuit or group of circuits is required to reconstruct from the sidebands pulse signals proportional to particle size, due to those changes in the sensing zone impedance which are primarily resistive, caused by particles of a given kind passing relative to the sensing zone. The output at 58 is equivalent to the output at 58 in FIGS. 2 and 3.

It may be realized that there is substantial equivalence between the structures of FIGS. 3 and 4 in a basic respect. The purpose of illustrating and describing FIG. 4 is to show and describe the versatility of the invention in many forms and variations, and also to illustrate and describe some basic concepts of the use of the invention.

The blocks 90 and 92 could be phase discriminating means, in which case there could be circuits relating the phase of the structure back to the source. These blocks and their paths conveniently may be referred to hereinafter as "channels" for the signals derived from the respective characteristics of the particles passing relative to the sensing zone. The connection to the source 32 is illustrated at 80 and has phase adjusting means 82 in the connection. The structure differs from that of FIG. 3 in that another connection 94 and phase adjusting means 96 are provided for the other detecting means 92. The detecting means in the case of all channels which are required to obtain information from radio frequency carriers modulated by changes in the sensing zone will obviously have to perform a demodulation function.

Now the discrimination between signals of one type and another can be achieved by means other than phase sensitive or synchronous detectors. One criterion is the type of modulation caused by each different characteristic. The apparatus may be so adjusted that the capacitive change will produce frequency modulation and the resistive effect will produce amplitude modulation. Hence, if the block 90 includes means sensitive only to phase or frequency modulation of the carrier while the block 92 contains means sensitive only to amplitude modulation of the carrier, the signals 56 and 58 will be those desired. In such a structure, the connections to the source and the phase adjusting means would not be needed. A modification of this would be to omit from block 90 the limiter which as will be mentioned later customarily precedes the frequency modulation discriminator to remove any amplitude modulation, so that the discriminator would respond both to amplitude and frequency modulation. Thus, there will be one signal at 58 which is related to resistive size primarily, while there will be a signal at 56 which, being a conglomerate, has components of both resistive size and capacitive size. These two signals, being less distinct than before, nevertheless contain valuable information about the particle which caused the both of them.

Mention was made of the counting of pulses from each of two channels related respectively to different characteristics of responses to the particles. In FIG. 4 such counters are shown at 98 and 100 for the signals at 56 and 58 respectively. The counter means in addition to or instead of actual counting devices may have accumulating means, rate meters, plotters, and the like. Instead of applying the signals directly to the counting means, they may first pass through threshold circuits which enable discriminating between different families of particles on the basis of their corresponding pulse amplitudes and which also enables population determinations in one or both channels. Such threshold circuits are shown at 102 and 104. The signals at 106 and 108 may therefore have already been operated upon in some way.

Reference is made in the claims to collating the signals. What is intended by this reference is some means for adding them, or subtracting one from the other, or otherwise comparing them, or dividing one by the other, or multiplying one by the other, etc. Such a circuit or means is shown generally at 110, and the output 112 from the collating means 110 may be used to drive another counting means 114.

The examples which have thus far been described have in common the fact that the sensing zone current will be supplied by a radio frequency source of energy, either fixed or variable. The descriptions of these examples have indicated that more than one source may be used, and it is clear that the structure described will as a general rule be duplicated when an additional radio frequency source is used. An additional source will have a frequency different from the first one used. Likewise, a direct current or low frequency source could be used along with one or more radio frequency sources. Such a structure could provide interesting and valuable information without the need for highly complex circuitry, notwithstanding the use of a radio frequency energy source. This is described in connection with FIG. 5.

Figure 5:
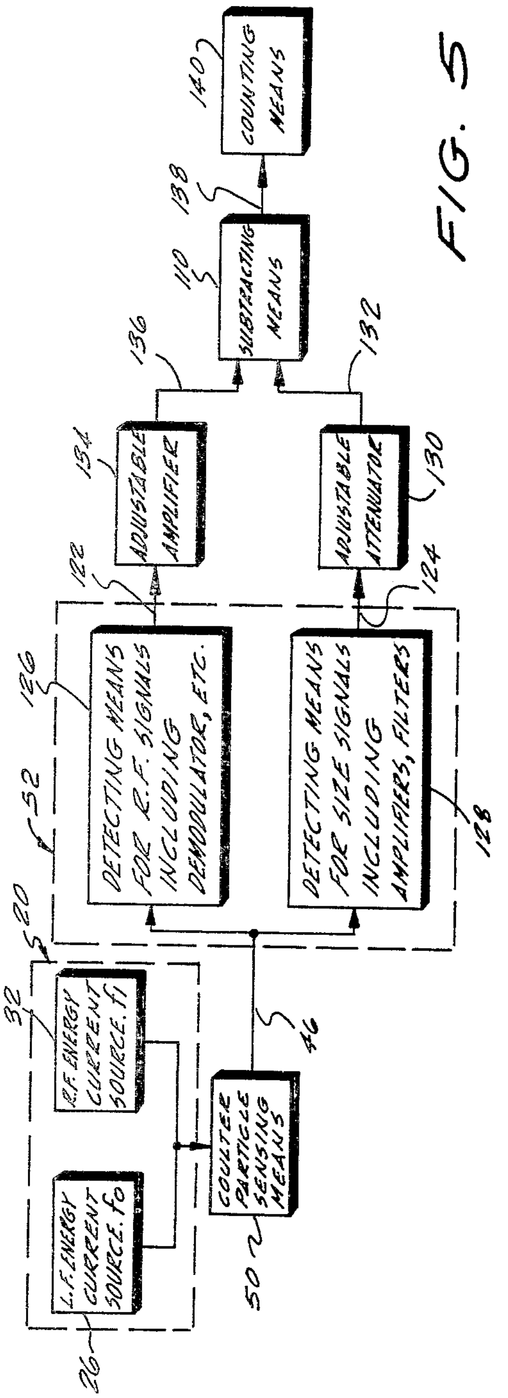
FIG. 5 is a block diagram illustrating a form of apparatus in accordance with the invention, utilizing two sources, one of which is radio frequency and the other of which is low frequency or D.C.

The simple apparatus of FIG. 5 utilizes two sources, so that the source means 20 consists of the radio frequency source 32 having a frequency *f*1 and a low frequency energy current source 26 of frequency *f*0, both sources being connected to produce a combined current in the sensing zone. The source 26 may be a direct current source or even one of low frequency compared with that of the radio frequency source 32. The only criterion is that the signals which are produced attributable to this source when particles pass relative to the sensing zone are proportional to size of the particle only. This will be true for frequencies at least up to the audio range. The convenience and nature of the materials being studied will determine whether direct current or low frequency will be defined as any frequency from zero frequency up through those frequencies at which the electrical changes in the sensing zone relate substantially to the particle size only.

The output signal at 46 from the sensing means 50 is applied to detecting means 52 and there are two outputs from the detecting means at 122 and 124. While generally equivalent to the outputs which have been designated thus far as 56 and 58, since there are differences which relate to the manner of deriving the signals, it will be clearer if new reference numerals are used. In the case of the signal at 124, it is of a nature that relates the signal to size of particles only. In other words, it is intended to be proportional to the size of particles passing relative to the sensing zone. The detecting means 128 could therefore be quite similar to the circuitry of a commercial Coulter Counter, with perhaps filter means to prevent R.F. from saturating the circuitry. If *f*0 is not zero frequency, there will have to be demodulating circuitry included in 128 but it may be of a simple nature, since the circuit may only respond to amplitude modulation.

In order to acquire a pulse amplitude for the signals related to size only which may be adjusted to some desired value, for a purpose presently to be described, means are provided to vary the pulse amplitude. The intensity of the sensing zone excitation for this signal channel may be varied or the detecting means 128 may have an amplifier whose gain is adjustable, or an adjustable attenuator 130 may be connected in the channel to receive the signal 124. Its output appears at 132.

With respect to the signals which are obtained as a result of the radio frequency portion of the sensing zone current, these could be treated as described in connection with either of FIGS. 3 or 4 in which case there will be two signal outputs in addition to that indicated at 132, or a total of three signals. Of these, one will be related to size only, one will be related to capacity effect at the terminals and size, and one will be related to resistivity effect at the terminals and size. In the structure of FIG. 5, no separation of the radio frequency signals into components is contemplated. Instead, the signal at 46 is applied to amplitude modulation detecting means 126 which merely provides an output signal at 122. The R.F. is demodulated, yielding the usual pulse-type signal. Thus, 126 may include filters, amplifiers, demodulators, etc. Since many particles are more "transparent" at radio frequencies, the signal pulses from this channel are smaller than from the other channel, other things being equal. In order to collate the signals, as will be done with this apparatus, it is necessary to adjust the signals. Usually the adjustment in 128 and/or 130 will be more practical and economical but an adjustable amplifier at 134 might be of value. Signals at 136 and 132 are applied to the collating means 110 which in this case is a subtracting circuit, such as for example a differential amplifier. The output at 138 may be applied to some form of counting means 140 or alternatively a device as a gate or multichannel analyzers, accumulators, recorders, visual display devices, and the like.

The structure described is a practical apparatus for causing the effects of one particle or another to be removed from a signal, by adjusting the output of the one channel to offset the output of the other for certain purposes. Suppose, for example, a mixture of particles is being studied, and it is desired to count or classify only one type. If the particles have substantially different dielectric constants, this is a simple matter. If the differences are more subtle, other arrangements would be employed using the principles as set forth herein.

If, in a suspension of particles such as red blood cells in saline which become increasingly transparent to radio frequency fields at higher and higher frequencies, two signals are produced due to a single particle, such signals being due respectively to different frequencies, the signal corresponding to the higher frequency will obviously have the lesser amplitude. Polystyrene has already been mentioned as an example of particulate material for which this effect is less pronounced. In the case of blood cells with thin shells, and containing liquids having good conductivity, the shell becomes "conductive" and the particle is practically transparent to flow of current. Conduction in this sense is intended to include the passing of displacement current due to the capacity effect as well as the usual migration of charges constituting conduction.

Figure 6:
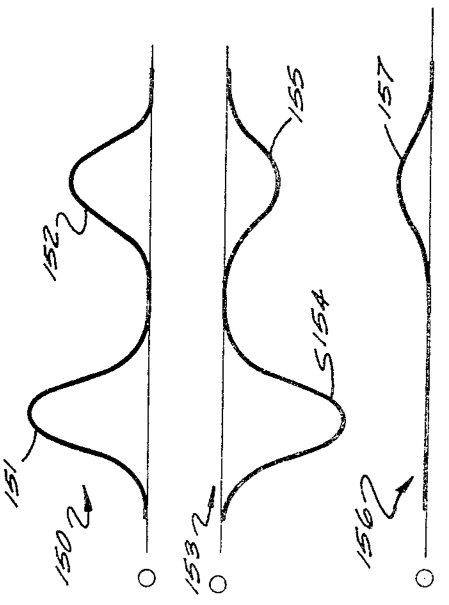
FIG. 6 is a chart showing the manner in which the output signals from the structure of FIG. 5 are collated.

In FIG. 6 the behavior of the circuit is explained in connection with use to separate information on two different kinds of particles of the same general size. In FIG. 6, there is represented at 150 the wave forms of two pulses at the point 132 of FIG. 5. The first pulse 151 represents a polystyrene particle and the second pulse 152 may represent a blood cell, both passing through the sensing zone consecutively. At 153 there is represented the wave forms of the signals caused by the same particles passing through the sensing zone, but in this case, the signals were obtained from the other channel and appear at 136. The signals 154 and 155 represent the same polystyrene particle and blood cell, respectively. The signals are positive going in the first case and negative going in the second case to suggest subtraction, although these signals may or may not be of the same polarity depending on the needs of subtracting means 110. The representation at 156 is the output pulse 157 at 138 produced as a result of the difference between the signals 152 and 155, the time and amplitude scales of FIG. 6 being the same in all cases.

What has been done in the case of one of the channels is to adjust the amplitude of the signal caused by the passage of the polystyrene particle so that it equals the amplitude of the pulse corresponding in the other channel. This has been discussed above and is achieved by attenuation in one channel or amplification in the other channel or both. The signals of 150 represent the signals achieved in the direct current field as a result of the passage of the same particles producing the signals at 153, the latter being due to modulation of the radio frequency current of the sensing zone.

It will be noted that, notwithstanding an adjustment of gain, the pulse 155 which is caused by the modulation of the radio frequency carrier by passage of the blood cell is much smaller than the direct current caused pulse 152.

If the signals from 150 and 153 are added algebraically at 110, that is, substracting one from the other without regard to sign, the polystyrene pulses 151 and 154 exactly balance one another, and the pulse 155 only balances so much of the pulse 152 as to leave a small pulse 157. This pulse appears at 138 and may be passed to the counting means 140. Other applications of this structure will suggest themselves. For examle, the apparatus could be arranged to respond only to the polystyrene particles, or the outputs could be combined in two proportions, supplying two subtracting means and counter or sizing means, etc., such that one counting means would receive pulses related only to the polystyrene particles, and the other pulses related only to the blood cells.

This same system woud be valuable in discarding signals due to noise or bubbles in a suspension, since bubbles, for example, behave like particles and can be cancelled out by this same technique. Modulation could be caused by turbulence in or near the sensing zone, acoustic disturbances, etc.

Even where two particles coincide within a sensing zone, the structure of FIG. 5 will detect the electrical changes due to each and separate the signals. This will be obvious from a simple wave form analysis, which need not be detailed here.

Figure 7:
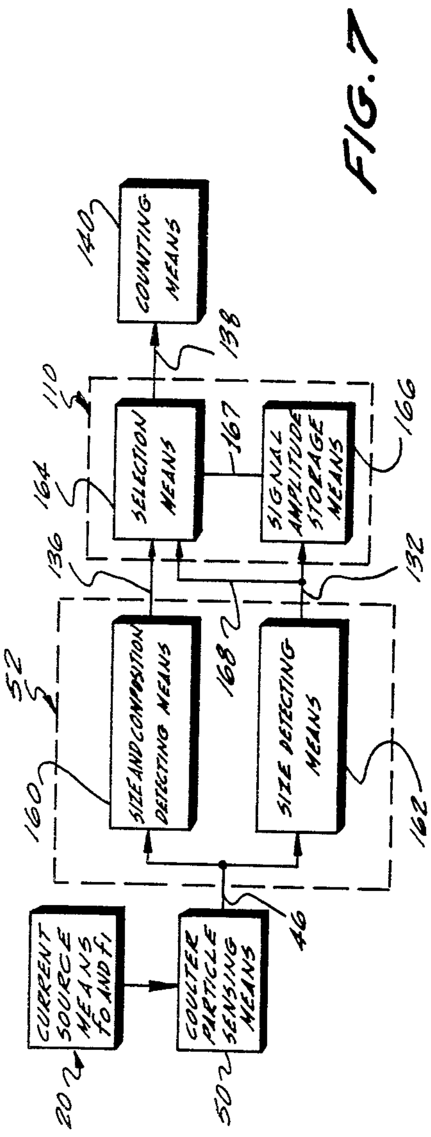
FIG. 7 is a block diagram similar to that of FIG. 5 but showing a different structure for collating the output signals.
Figure 8:
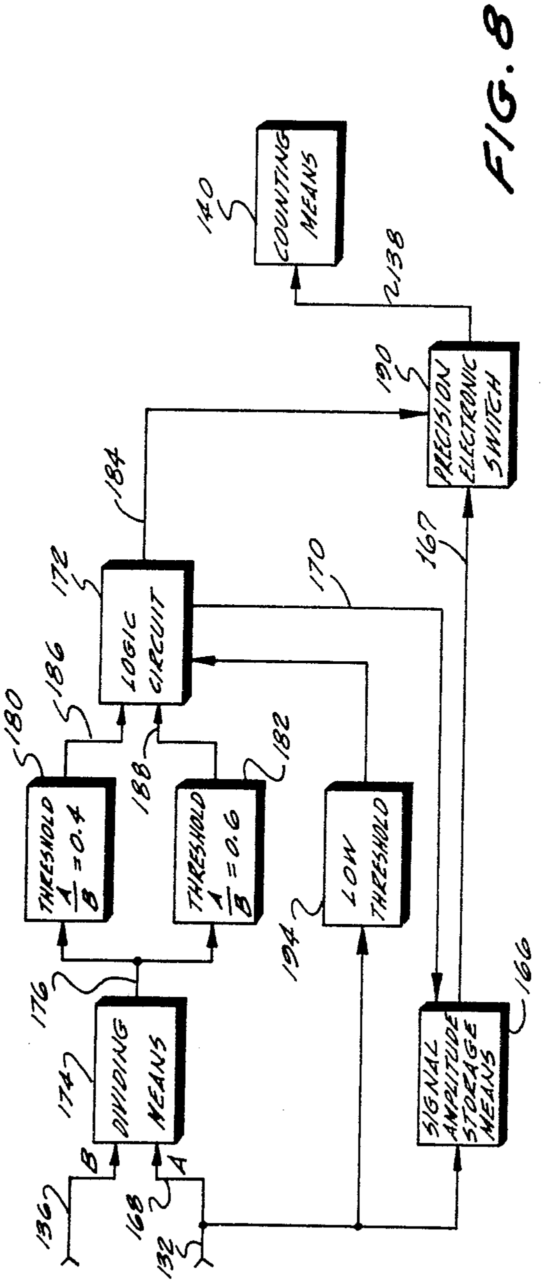
FIG. 8 is a block diagram detailing the output portion of FIG. 7.

In FIGS. 7 and 8 the structure of FIG. 5 is arranged in a device for performing a size distribution study on one type of particle in a mixture of many types which are capable of being classified by the method explained. In FIG. 7 the current source means 20 comprise the same two sources as that of FIG. 5, and for simplicity, the detecting means 52 is shown as a block containing two elements which are referred to as size and composition detecting means 160 and size detecting means 162. These blocks contain all of the structure needed to provide the outputs at 136 and 132 which are the same as those designated by the same numerals in FIG. 5. The signals at 132 and 136 are applied to some form of collating means 110 which in this case comprise the selection means 164 and the signal amplitude storage means 166, the collated output at 138 being applied to some form of counting means 140, or any other useful device.

In FIG. 7 both types of pulses are presented to the selection means 164 at the channel 136 and by a connection 168 from the channel 132. The signal which is representative of size information only, is stored in the signal amplitude storage means 166 by a suitable circuit, such as for example a pulse stretcher. This type of circuit assumes a voltage which is a function of the amplitude of a pulse, and maintains it until reset. The selection means 164 determines whether the particle is of interest for processing, at which time a pulse of amplitude corresponding to the size of the particle is sent from the storage means 166 via the lead 167 and the output 138 to the classification or counting means 140. If the particle is not of interest, the size information is discarded and the system is reset until the next particle moves through the sizing zone. The selection means is constructed as apparatus which will accept or reject depending upon the relative amplitudes of pulses from both channels.

The block diagram of FIG. 8 discloses details of an apparatus exemplifying one usage of a collating device as shown basically in FIG. 7. The signals at 132 are applied to signal amplitude storage means 166, which is shown at the bottom of the view. The remaining blocks of FIG. 8 with the exception of the counting means 140 comprise the selection means 164.

The signals at 132 which are produced by the unidirectional sensing zone energy represent the size of the particles which caused them, and the signals at 136 which are produced by the radio frequency sensing zone energy represent the size and composition of the particles which caused them. Using the nomenclature suggested in connection with FIG. 7, the first signals may be considered to pass through a size only channel, and the second signals may be considered as passing through a second channel, the size and composition channel. As indicated, the simplest structure may be an amplitude demodulator insufficient to differentiate between resistive and capacitive caused modulation. The pulses will in effect be conglomerates, but nonetheless related to composition and size.

The pulses from the channel 132 are applied to the signal amplitude storage means 166, which as stated, will retain a signal level representing the amplitude of a pulse applied, even after the pulse subsides, until it has been reset. In this case, the reset signal is applied through the connection 170 from the logic circuit 172. The dividing means 174 accepts pulses from both channels, these pulses being of amplitude A and B at 132 and 136, respectively. After an interval of time which may be of the order of the duration of a signal pulse, an output pulse is emitted at 176 which is proportional to the quotient of the amplitudes of the signals. Since the factor of size has been canceled out by the process of division, the amplitude of the pulse at 176 will be a function of the composition of the particles. In other words a given type of particle will produce a certain size of pulse at the point 176 regardless of the size of the particle. The two threshold circuits 180 and 182 are arranged to form a "window" which responds by producing an output pulse at the lead 184 only if the amplitude of the pulse at the lead 176 lies between the settings of the threshold circuits 180 and 182. In this example, one circuit is shown set at a value of $A/B=0.6$ while the other is shown set at a value of .4. Many logic circuits with this capability have been devised, as for instance one which is disclosed in U.S. Patent 2,551,529. If the pulse produced at 176 does fall between the threshold levels formed by the circuits 180 182, there will be an output at each of the leads 186 and 188, and the simple logic circuit 172 will produce a signal at 184. This will trigger a precision electronic switch 190 thereby connecting the lead 167 to the lead 138 typically for a few microseconds, thereby producing at 138 a new pulse, the volume of which represents the amplitude of the particle selected for measurement.

If the pulse on the lead 176 does not fall between the threshold levels of 180 and 182, no pulse appears on the lead 184 to close the electronic switch 190, and the pulse is disregarded. The pulse stretcher 166 is reset in preparation for the next particle either by the trailing edge of the output pulse of low threshold circuit 194 or by the trailing edge of the pulse at lead 184, depending upon whether the output of the signal amplitude storage means 166 is used. The low threshold circuit level is set at such level that all particles of interest will produce signals which cause it to have an output.

Figure 9:
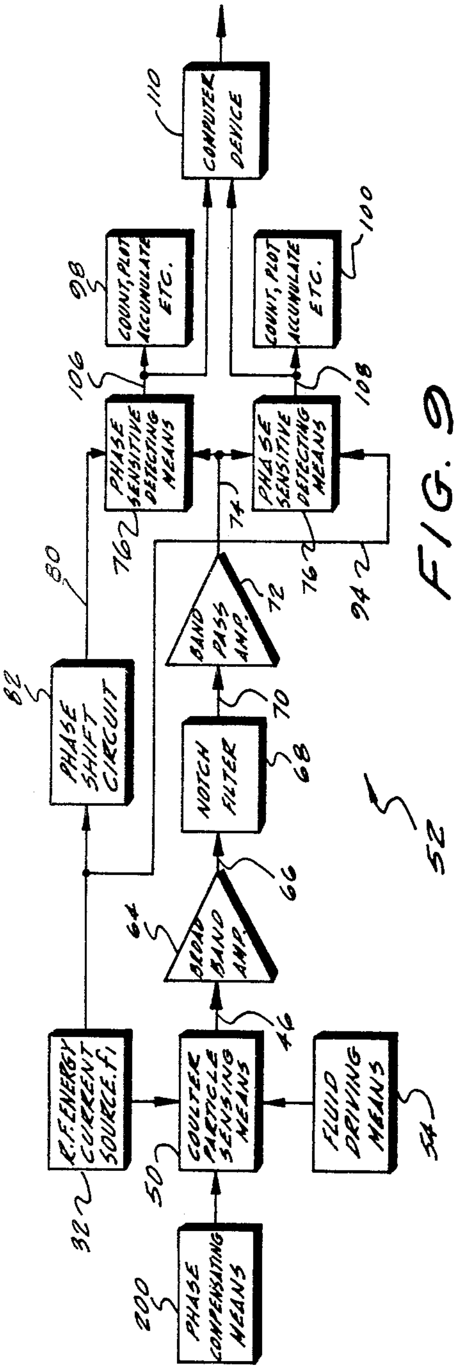
FIG. 9 is a detailed block diagram of an apparatus like that of FIG. 3.

A detailed block diagram of the structure of FIGS. 3 and 4 is shown in FIG. 9. It differs only in a small degree from those two figures, and the reference characters are to a great extent equivalent. The structure need not be explained in detail, except to point out that in this case the phase sensitive detecting means 76 is shown as two detectors each of which is related to the phase of the source, but one of which has a phase shift circuit interposed between it and the source to assure that there will be a phase difference between the two resulting signals. The element designated 200 is the phase compensating means for obviating the deleterious effects of the sensing zone and adjacent parts upon the phase relationship of the electrical changes with respect to the sensing zone supply current. This element is shown in the equivalent circuit diagram of FIG. 1.

Up to this point, it has been considered that the effects of finite source impedance and phase shifting produced by the capacitive effects of the sensing zone have been a minimum and hence they have been ignored. As a matter of practicality, these two aspects of the structures of the invention could be important.

The effect of a finite source impedance and the capacitance of the sensing zone is to make the obtaining of pure signals difficult. A finite source impedance connects a modifying impedance in circuit with the sensing zone, and by loading or similar effects, changes the simple relationships desired and required to produce output signals capable of ready analysis. With a finite source, the output signals at 46 are complex functions of all imepdance changes in the sensing zone and source circuits when a particle passes, since a change of aperture impedance will also cause a complex change in the aperture current. When an infinite impedance source is used to energize the sensing zone, the output signal is proportional to the change of impedance caused by the passage of a particle, at any time, and the constant of proportionality is the sensing zone current. This is expressed simply as the voltage at 46 is equal to the product of the sensing zone current, which remains substantially constant, and the impedance of the sensing zone. Such a structure will produce a signal in which the quadrature component of the signal output which represents capacitive change at the sensing zone due to the presence of a particle can be identified and analyzed without a great deal of difficulty, and hence separated in the detecting means from the resistive component. Without taking the steps to assure a substantially infinite impedance current source, or without some compensation the sensing zone steady state signal will not usually be in phase with the sensing zone current for any given frequency.

If the source has a substantially infinite impedance, but care has not been taken to keep the drop in the sensing zone in phase with the sensing zone current, the changes in the output signals at 46 due to the passage of a particle through the sensing zone will be as follows: The resistive change will be in phase with the sensing zone current and the capacitive change will be 90° out of phase with the sensing zone current and the resistive change. Phase sensitive detecting means may be used to separate the components of the signal due to the passage of a particle but will not yield the same information. Simple amplitude and frequency demodulating means can be used for separation.

Making the sensing zone current source of very high impedance with respect to the remainder of the sensing zone circuit is not difficult. One uses pentode tubes or other such constant current means in the oscillators used in the radio frequency sources, or a simple Norton equivalent or high ohmage resistors in the direct current or low frequency sources.

Reference to FIG. 1 will show that the capacitors C2 and C1 in the equivalent circuit provide the problems of phase shift, even at steady state. These capacitive effects should be compensated in some way, even assuming that the respective branches of the source means 20 have been rendered infinite in impedance or substantially so. A preferred way of doing this is shown in the network 200.

Figure 10:
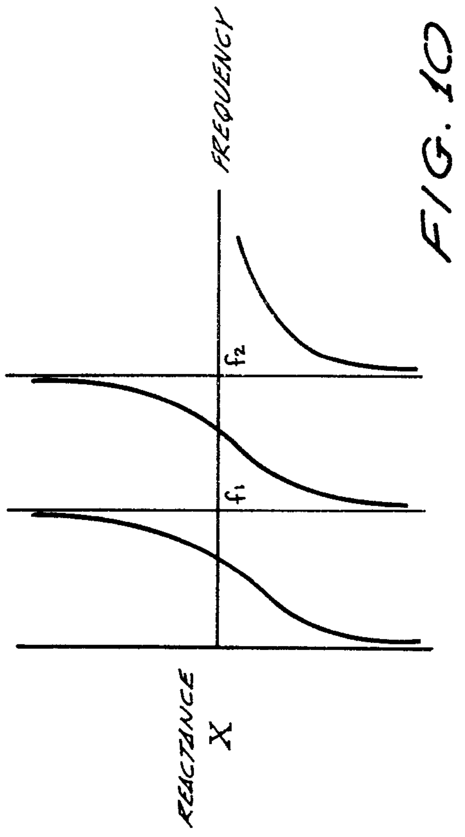
FIG. 10 is a graph of reactance versus frequency for an anti-resonant phase compensating circuit used in the structure of FIG. 9.

The network 200 represents means for tuning the sensing zone to anti-resonance at the frequencies of the sources 30 and 38, or if there is only one, a simple anti-resonant circuit may be used. Anti-resonance at the frequencies used will cause the sensing zone circuit to have substantially infinite shunting reactance at these frequencies. The circuit in FIG. 1 has one branch consisting of the inductance L1 and the capacitance C4 in series, the other branch having an inductance L2 and a capacitance C5 in series. By techniques familiar to those acquainted with network theory, the values of capacitors and inductors may be chosen to give the necessary anti-resonant conditions at frequencies $f1$ and $f2$. In FIG. 10 there is illustrated a graph of the shunt reactance of the total circuit comprising the elements of equivalent networks 42, 44 and 200 of FIG 1, versus frequency, no particular scale being used, but the vertical axis representing reactance in ohms, and the horizontal axis representing frequency in cycles per second. Note that at the frequencies $f1$ and $f2$ the reactance theoretically approaches infinity. The two series resonant frequencies are not used.

If the sensing zone is thus tuned, and its energizing source supplies substantially constant current, the signal component due to the momentary change of the capacitance of the sensing zone caused by the passage of a particle will be in quadrature with the sensing zone current, while the signal component due to momentary change in the resistance of the sensing zone will be in phase with the aperture current.

Both the anti-resonant tuning and the increasing of the source impedance are of value in obtaining improved response, ease of detection and separation of components, and better maintenance of quantitative relationships and hence better calibration.

One special case may be mentioned where the source is primarily capacitive and the sensing zone impedance is also capacitive. In this case, the changes by passage of a particle will produce a resistive component in quadrature with the sensing zone current, while the capacitive component will be in phase with the sensing zone current. Tuning to anti-resonance is neither required nor desirable. A situation of this kind obtains where the suspending fluid has good insulating properties, such as for example in the case of oils and hydrocarbons. Small power factors enhance the effects.

Advertising now to FIG. 9, the phase compensating means 200 used here is not essential as in the case of the structures described which do not use phase sensitive detecting means. No doubt, the use of the phase compensating means in the type of a circuit of FIG. 9 will provide better results by providing more efficient use of aperture current, but the phase sensitive detectors shown will respond to different signal components irrespective of the phase of the carrier. For completeness of the drawings, a structure not having phase sensitive detectors is shown in FIG. 11, and the characters of reference being readily related to other views, no detailed explanation is believed necessary.

Figure 11:
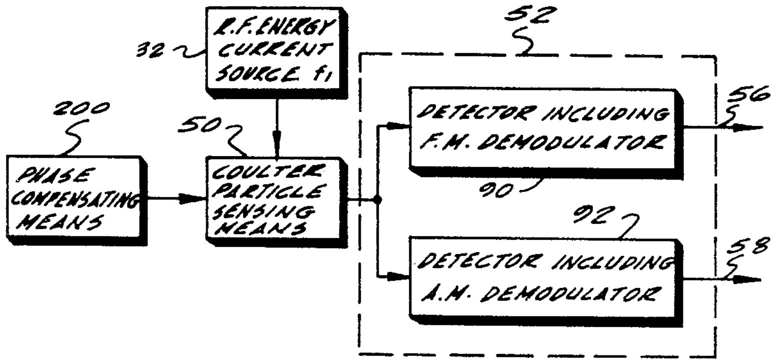
FIG. 11 is a block diagram of a simplified structure using one radio frequency source and phase compensating means.

The structure of FIG. 11 utilizes a source of only one frequency $f1$ and hence the phase compensating means need be anti-resonant at only that one frequency. The outputs at 56 and 58 should provide excellent separation of the components in the side bands, especially if the source 32 is rendered substantially infinite in impedance in addition.

Figure 12:
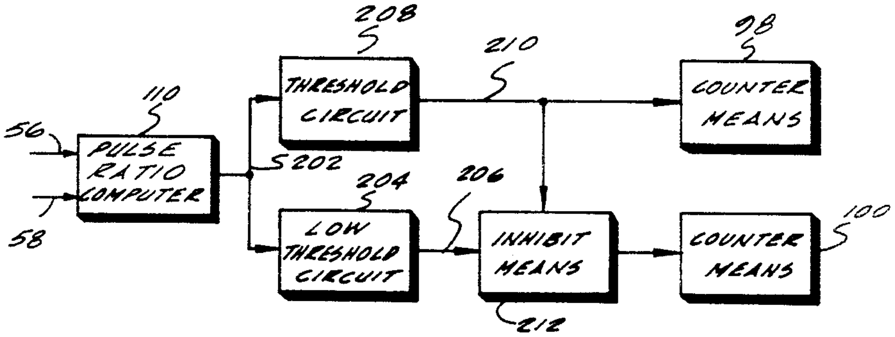
FIG. 12 is a block diagram of structure for classifying particles in accordance with the relative phase angle produced by pulses due to such particles.

In FIG. 12 a structure is shown which utilizes means for classifying particles according to whether their phase angles are lesser or greater than a predetermined magnitude. If the phase angle of the signal is defined as the arc tangent of the quotient of the change of reactance divided by the change of resistance, a threshold adjustment may be given as a non-linear scale such that rotation of a potentiometer which sets its level is proportional to the tangent of the phase angle and calibrated by the phase angle. The source of the circuit of FIG. 12 would be a single frequency source of substantially infinite output impedance as described above. The phase compensating circuit such as 200 would be used to simplify phase relationships, although this may be omitted if there is a connection to the source as indicated in the figures showing phase sensitive detection. This type of detection is often referred to as synchronous detection.

The pulses which appear at 56 and 58 represent the reactive and resistive changes caused in the sensing zone by the passage of particles. These are applied to a pulse ratio computer which is a collator 110 which generates a pulse at 202 which is proportional to such ratio. For example, this may be the ratio of the reactive pulse to the resistive pulse. Low threshold circuit 204 is arranged to generate a count pulse at 206 whenever a pulse of any height is produced at the lead 202. If, however, the pulse at 202 is of sufficient amplitude to cross the threshold level established in the threshold circuit 208 producing a count pulse at 210 and adding a count in the counter means 98, the inhibit means 212 serves to disconnect the low threshold circuit 204 from the counter means 100. In this manner all pulses having a phase angle greater than the setting of the threshold circuit 208 are counted by the counter means 98 and all pulses smaller than the threshold setting of the circuit 208 are counted by the counting means 100. The threshold circuit 208 is calibrated in terms of particle phase angle.

Figure 13:
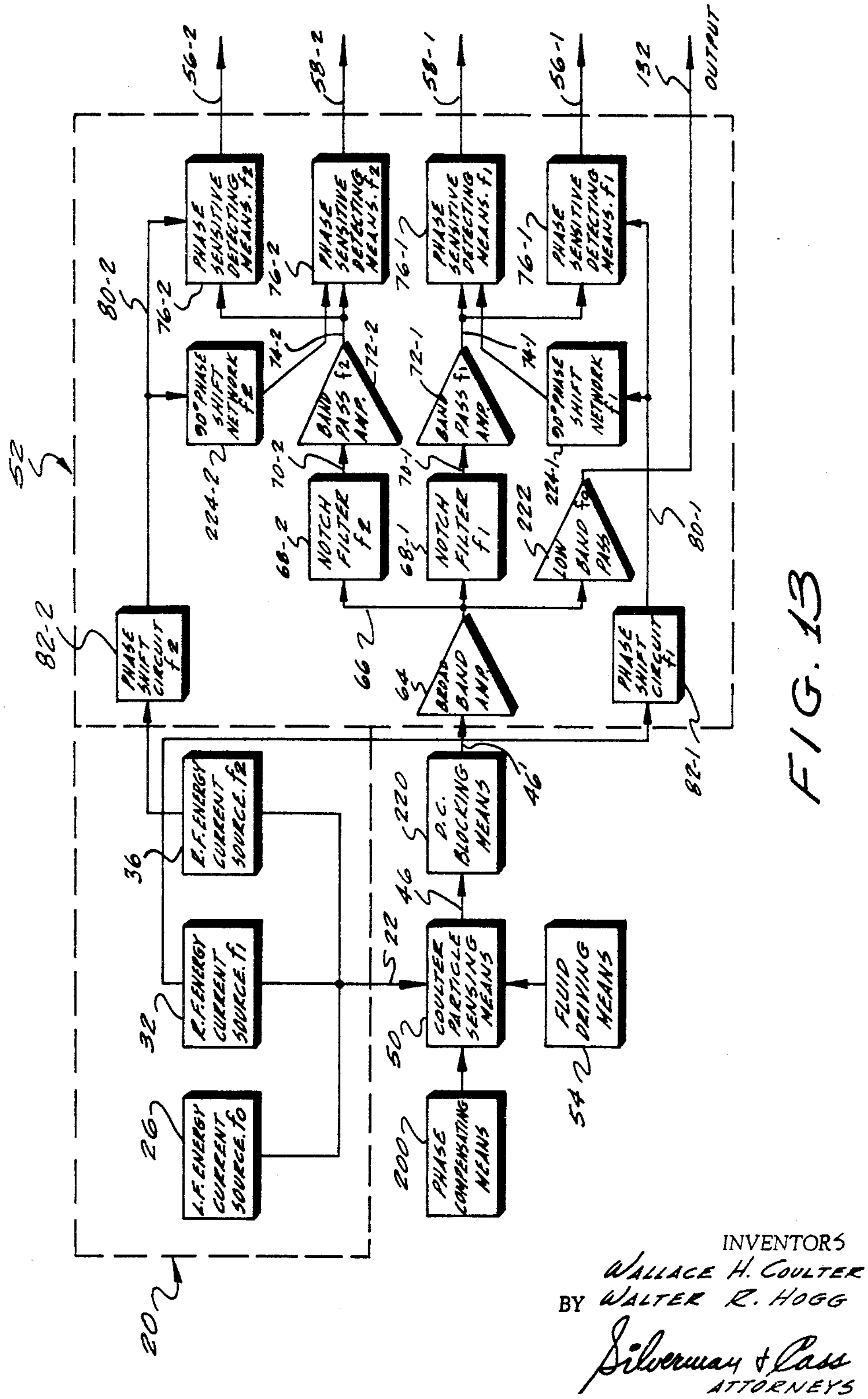
FIG. 13 is a block diagram of apparatus which uses three sources, two of radio frequency and one of low frequency or direct current.

The structure shown in FIG. 13 comprises particle classifying and analyzing apparatus constructed in accordance with the invention in which the current source means 20 is formed of three separate sources: 26 which is a low or zero frequency source *f*0; 32 is a radio frequency source of a frequency *f*1; and 36 is also a radio frequency source of a frequency *f*2. The sensing zone of the Coulter particle sensing means 50 is energized by all three sources simultaneously through the connection 22, and the relationship and function of the various components to the discussion and illustrations which have appeared hereinabove may readily be followed by noting the reference numerals. Where feasible, as throughout this entire specification, like numerals refer to the same or equivalent parts or components.

The phase compensating circuit 200 is of the character described in connection with FIG. 1, and in this case such means will be tuned to provide anti-resonance as two frequencies. By such circuit the reactive effects of the sensing zone for steady state conditions have been substantially eliminated so that practically, the modulation effects due to the changes produced in the sensing zone when a particle passes relative thereto will be orthogonal and organized to facilitate methodical analysis. The output from the sensing zone will be applied at 46 to the D.C. blocking means 220, which assumes that the frequency *f*0 is zero frequency or direct current and the source 26 is direct current. The modulated signal at 46' has substantially no direct current component.

The broad band amplifier 64 applies the signals to the notch filters 68–1 and 68–2 through the connection 66 which also applies the signals to the low band pass amplifier circuit 222. Each of the notch filters 68–1 and 68–2 is tuned to reduce the carrier attributable to the radio frequency sources 32 and 36, respectively. The attenuated signals appearing at 70–1 and 70–2 are applied to their respective band pass amplifiers 72–1 and 72–2. These amplifiers function to reject from each of the attenuated signals all of the components outside of the side bands, and especially to reject those signals caused by energy at the frequency of the other carrier. Thus, the band pass amplifier 72–2 will pass only the remanant of the carrier *f*2 and its side bands and will reject any signals which occur outside of that band, including those caused by the carrier *f*1 being modulated and any harmonics or intermodulation products which are inadvertently produced. The band pass amplifier 72–1 on the other hand does the same for the side bands of the modulated signal on the carrier *f*1. These band pass amplifier also increase the useful amplitude of the signals because the modulation products are very small compared with the signals derived from the source 26. Practically, the requirements of sensitivity of the phase detecting means are rendered less stringent with higher level input signals. The corollary is true, namely, the more sensitive the detecting means, the less gain is needed from the amplifiers.

The outputs from the amplifiers 72–1 and 72–2 appear at the connections 74–1 and 74–2, respectively, each output being applied to two phase sensitive detecting means. The lower of these are designated 76–1 and the upper are designated 76–2. These phase sensitive detecting means are of conventional construction, but the circuits of these devices preferably should be carefully designed to ensure that the proper phase relationships hold true, and these should be related to the circuits 224–1 and 224–2 which are the phase shifting means to provide the quadrature inputs. One or the other of the detecting means of each pair will provide the signal output due to resistive components (size and resistivity), and the companion detecting means will provide the signal output due to reactive components (size and capacity). For this reason it should be realized that the designation of the outputs 56 and 58 in FIG. 3 for example, is arbitrary. In FIG. 13, it may be assumed that 56–1 and 56–2 are capacitive, while 58–1 and 58–2 are resistive. One would be required to study all of the actual circuits and elements of a given structure in order to ascertain this in advance for positive identification, but practically, one is always primarily resistive and the other primarily capacitive. The relative phase is the only criterion of importance.

The phase sensitive detecting means will demodulate the remanent signals at 74–1 and 74–2 to produce pulses proportional to the resistive and reactive effects of the passage of particles relative to the sensing zone. Both of each pair of detecting means are related to their respective sources through the respective reference lines 80–1 and 80–2, one of each pair being affected by the 90° phase shift circuits 224–1 and 224–2, respectively. The detectors will thus be sensitive to signal components 90° apart. The circuits 82–1 and 82–2 are optional means for manual adjustment of phase.

It will be appreciated that there are four output signals in the structure of FIG. 13 which have been provided by the passage of a single particle relative to the sensing zone, and this provides a substantial amount of information relative to the size and composition of the particle. Size information alone may be simultaneously achieved without the requirement of collating means to separate the signals by complex circuitry. The low frequency source 26 produces an output at 64 which is applied to the low band pass filter 222 that removes all radio frequency signals, including carrier and side bands. Thus the output at 132 is a signal related purely to size of the particle. The simple detecting means described for the low frequency channel need not be much different from those used in the presently known Coulter Counters and hence the output at 132 will be a signal directly proportional to the particle size.

All of the signals from the apparatus of FIG. 13 will be positive or negative going pulses, easily classified, analyzed, counted and so on. Some novel examples of collating means will be described in connection with FIGS. 14 and 15 hereinafter. Also, alternate means for detecting the signals from the sensing means will be described.

Note that in FIG. 13, the structure utilizes phase sensitive detecting circuits in order to achieve the separation of the signal components described. The reference connections which comprise the 90° phase shifting circuits 224–1 and 224–2 and their channels to the current sources are required in order to achieve the separation because of the use of phase sensitive detecting means. The phase shifting networks 82–1 and 82–2 are practical means to take care of phase variations occurring as a result of inadvertent phase shift occurring in the circuits between the sensing means 50 and the phase sensitive detectors. One might calibrate the operation of an apparatus by passing known particles through the aperture for a given set of conditions and observing the behavior of the apparatus and its outputs, making the adjustments needed. In this circuit, that is, FIG. 13, the phase compensating network 200 is not essential, although it is desirable. Adjusting the impedance of the sources to be very high, i.e., as close to infinity as feasible, is very useful for maintaining simple relationships between aperture impedance changes and the resulting electrical signals.

Figure 14:
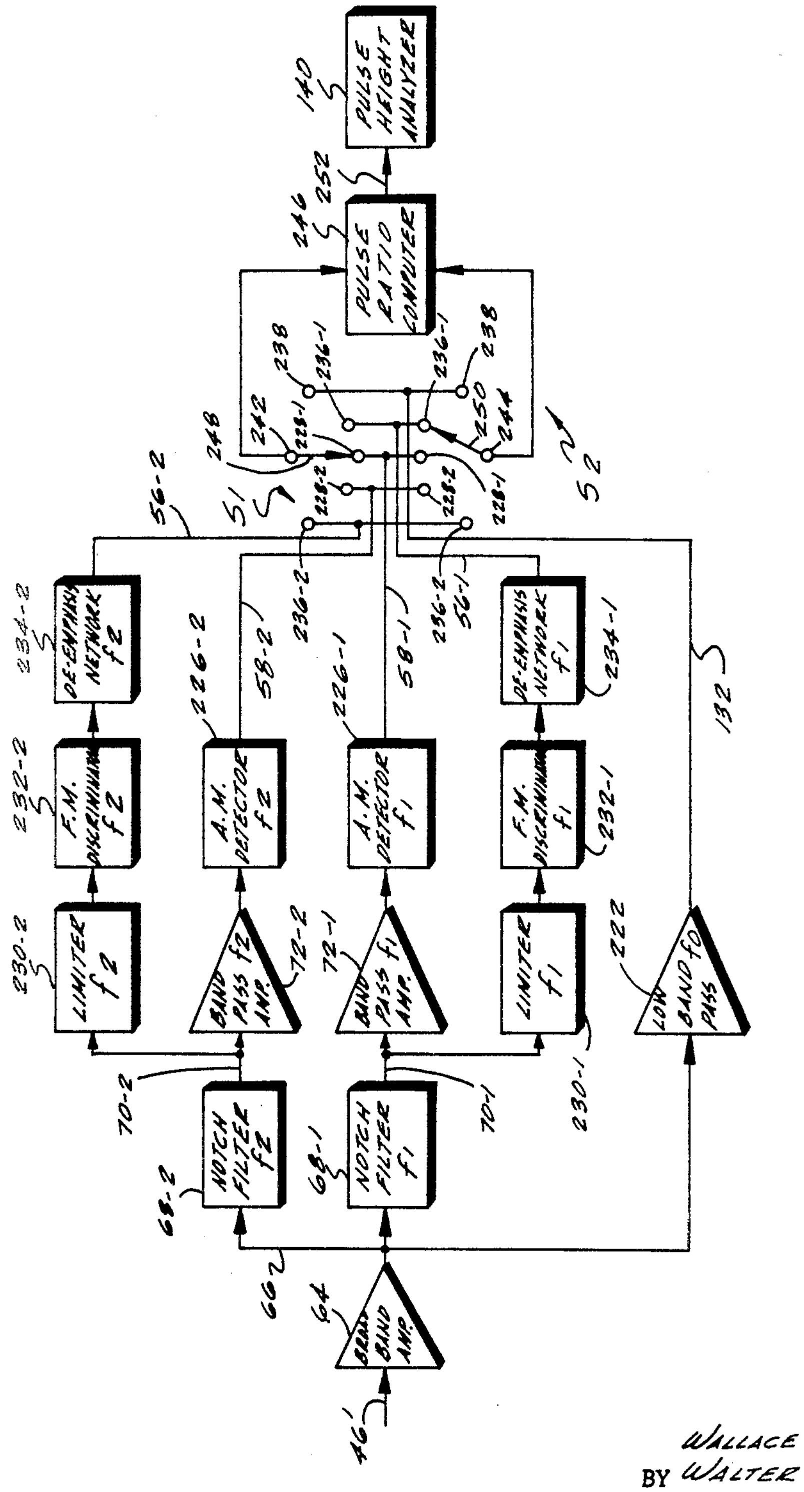
FIG. 14 is a block diagram of apparatus similar to that of FIG. 13, but of modified form.

In FIG. 14, which is the block diagram of a structure that does not use phase sensitive detection, the need for phase compensation tuning of the sensing zone is practically a necessity. Here, the portion of the apparatus to the left of the line 46' may be assumed identical to that of FIG. 13. Likewise, the notch filters, band pass amplifiers and the low band pass circuit are connected in the same way as in FIG. 13. The structure is designed, however, to form amplitude modulation and frequency modulation channels, and the separation of the components of the signals in the side bands is accomplished by the use of demodulators for demodulating conventional amplitude and frequency modulated signals.

Thus, the line 70–1 feeds the band-pass amplifier 72–1 and this signal goes through the amplitude modulation detector 226–1 to provide an output at 58–1 which is connected to the switch terminals 228–1. The resistive size signal will appear at 58–1. The line 70–1 also applies the signals from the notch filter 68–1 to the frequency modulation channel comprising the limiter 230–1, the discriminator 232–1 and the de-emphasis network 234–1, providing an output at 56–1 which is connected to the switch terminals 236–1. This output is the capacitive size signal obtained at the frequency *f*1. The notch filter if employed should not reduce the carrier so much that distortion components are generated.

In the same manner, the amplitude modulated and frequency modulated components of the signals due to the passage of the particles through the sensing zone at the frequency *f*2 will provide signals at 56–2 and 58–2, these being connected to switch terminals 228–2 and 236–2. The output 132 of the low frequency channel is connected to the switch terminals 238.

The components of the signals due to capacitive change primarily phase modulate the carrier, and those due to resistive change primarily amplitude modulate the carrier. Phase modulation is similar to frequency modulation except that the degree of modulation is proportional to modulating frequency. The limiters 230–1 and 230–2 are conventional circuits of the type used in frequency modulation radio receivers for example, and they remove the amplitude modulated components of the modulated signals. Their outputs comprise pure frequency modulated signals and a simple frequency modulation detector yields as its output a voltage proportional to frequency deviations. The modulation detector in each channel comprises the discriminators 232–1 and 232–2 which produce interim signals representing the frequency shift, and the deemphasis networks 234–1 and 234–2 which convert frequency shift information into a phase shift information. Since phase shift is a measure of the capacitive effects caused by the particles passing relative to the sensing zone, the outputs at 56–1 and 56–2 are signals which represent the effects of change in capacitance and size only due to passage of the particle.

Since the signals caused by change in resistivity and size produce primary amplitude modulation in this apparatus, they may be detected directly from the signals out of the band pass amplifiers 72–1 and 72–2 by the use of any convenient amplitude modulation detecting device as shown at 226–1 and 226–2. The outputs from the detectors previously have been identified.

The switch terminals referred to above are provided on the switches S1 and S2. Each switch has an output terminal at 242 and 244, respectively, and these terminals are connected to a pulse ratio computer 246. The movable arms 248 and 250 of the switches enable the terminals 242 and 244 independently to be connected to any one of the outputs so that the two signals on the terminals 242 and 244 may be any combination of output signals. The pulse ratio computer 246 divides the signals by one another, producing a third signal at 252 which is proportional to their ratio. This signal in turn may be studied or used in any suitable apparatus, as for example, counters, pulse height discriminators and the like, the block 140 being the equivalent of the counter means previously referred to herein carrying the same and other reference numerals.

It should be manifest by now that the capabilities and possibilities of the invention are of rather wide scope, since there are many ways of obtaining the multiple signals from the individual particles in order to enable identification and classification of the particles, and likewise there are many ways of collating the signals to identify, classify and analyze. Many possibilities of utilizing the signals have been disclosed and suggested, and many others will occur to those familiar with this type of apparatus and those familiar with the field of particle study. One very important consideration, which might be ignored by a reader if not pointed out is that the concepts of this invention are so new that no known techniques, standards or identifying guideposts have yet been devised to utilize the information capable of being obtained. It cannot help but be recognized that the information to be achieved from the use of the invention is practical, reproducible, and bears sufficient relationships to the character of the particles causing the same as to be of great value. The newness of the type of information may give rise to a radical departure from the classical methods of particle analysis.

Because of the above described factor, the method of utilizing the signals and the apparatus to be applied to such methods have been disclosed generally, and not specifically. The studies capable of being made by the use of the invention are in addition to those always associated with the classical presentation of particle data.

Figure 15:
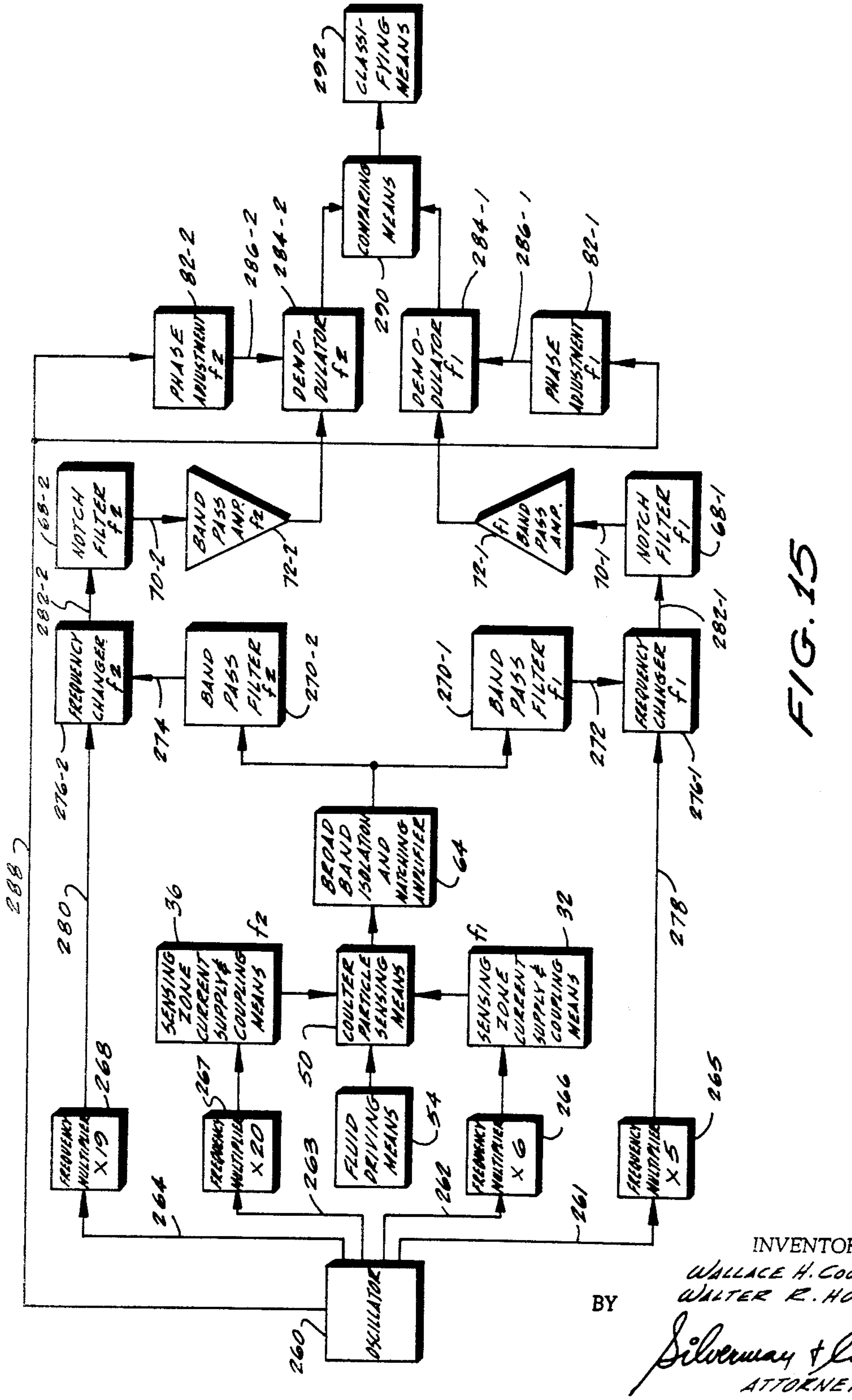
FIG. 15 is a block diagram of apparatus which uses a single oscillator to produce a plurality of current sources, each having a different frequency.

In order to demonstrate the breadth of scope and the changes in general structure which can be made without departing from the basic concepts of the invention, a structure has been illustrated in FIG. 15 in which a plurality of currents of different frequencies is generated from a single oscillator, thereby eliminating the relative drift which could be a problem if all the currents were supplied by separate oscillators.

In FIG. 15, a direct current sensing zone source is not shown, but readily may be included, if desired, in addition to the radio frequency sources shown. Similarly it is understood that the sensing zone current supply and coupling means may include circuitry for providing the substantially infinite impedance preferable for energizing the sensing zone, and may also include the tuning circuitry for organizing the phase relationships. As pointed out, components may be added or omitted as the need dictates. For instance, the demodulators may not be of the type which require a phase reference signal, in which case the connection to the oscillator and the phase adjustment circuits may be eliminated.

A crystal oscillator 260 is connected by the lines 261, 262, 263, and 264 to the frequency multipliers 265, 266, 267 and 268. For the purpose of this discussion it will be assumed that the frequency of the oscillator 260 is 500 kc. The frequency multipliers raise this frequency by convenient factors, such as 5, 6, 20 and 19 respectively. The multiplication factors of the upper and lower pairs differ by unity. The multipliers 266 and 267 excite the sensing zone current supplying and coupling means 32 and 36 at frequencies of 3 megacycles per second and 10 megacycles per second, respectively. Thus the elements 266 and 267 may be included as parts of the respective current sources 32 and 36. Additionally, the compensating network 200 of FIG. 1 is assumed to be included in the blocks 32 and 36. Broad band amplifier 64 serves to isolate the sensing means from the filters which follow. Band pass filters 270–1 and 270–2 serve to discriminate against all unwanted frequencies, if desired. The only useful frequencies are the 3 mc. and its side bands which appear on path 272 and the 10 mc. and its side bands which appear on the path 274. The signals containing the particle information are applied to frequency changers 276–1 and 276–2 by the connections 272 and 274 where they are heterodyned with the frequencies developed by the frequency multiplier 265 and 268 respectively. These differ from the carrier frequencies by the oscillator frequency, 500 kc. The connections from the multipliers 265 and 268 are designated 278 and 280.

The output frequencies from the frequency changers 276–1 and 276–2 at 282–1 and 282–2 will contain the sum and difference frequencies of their respective input frequencies. Thus the output path 282–1 will contain the frequencies 500 kc. and its sidebands and 5.5 mc. and its sidebands. The output on the path 282–2 from the frequency changer 276–2 will contain the frequencies 500 kc. and 19.5 mc. and their sidebands. These signals may be applied to notch filters 68–1 and 68–2 for suppression of the carriers to increase the apparent degree of modulation, if desired. Each signal is then amplified by band pass amplifiers 72–1 and 72–2 which simultaneously increase the signal level and reject the unwanted frequencies 5.5 mc. and 19.5 mc., respectively. Only the useful signals centered about 500 kc. are presented to the demodulators 284–1 and 284–2 respectively.

The demodulators may be of any type discussed above and may have phase reference signals applied to them by way of paths 286–1 and 286–2 from phase adjustment circuits 82–1 and 82–2 respectively, both of which connect on the line 288 with oscillator 260. As before these phase adjustment circuits may be used to correct for inadvertent phase shifts in their respective signal channels or to permit choice of signals of other phase as desired.

The outputs from the demodulators are both fed to comparing means 290 where one or several operations as previously described may be performed, and the resulting signals are classified at 292 in what has been designated classifying means. This device may be a multi-channel analyzer, a window-typesingle channel analyzer, or actuators or other devices.

Many of the components shown may be omitted or replaced by others. The apparatus shown may respond either to the resistive size signals or the capacitive size signals, depending upon the settings of the phase adjusting circuits 82–1 and 82–2, or these circuits may be adjusted for a maximum of overall response to specific signals representing a particle of special interest, disregarding phase angles. Likewise, the adjustment may be made in such a way as to minimize the response from certain kinds of particles. Likewise, four demodulators may be provided as employed in structures previously described as for example in FIG. 13. If the sensing zone current supply means include the tuning means 200, and enough carrier is present to preclude more than a minimum of distortion, the FM and AM demodulators of FIG. 14, for example, could be used and the phase adjustment circuits 82–1 and 82–2 and their connections omitted.

This invention is most conveniently applied to apparatus wherein a single sensing zone as for example any of the type illustrated in the basic patent, 2,656,508. It is possible, however, to apply the principles described to apparatus wherein the sensing zones are displaced along the stream from one another. In this case a memory or pulse storage system would be employed to hold the pulse produced in the first (upstream) zone until it could be collated or compared with the pulse produced by the same particle as it traverses a second or downstream sensing zone. Two pairs of transverse electrodes instead of one pair of electrodes as shown in FIG. 10 of the basic patent might be employed. The electrode pairs might be in the same plane but with axes and fields perpendicular to each other or displaced along the stream. Many other combinations will be suggested by the teachings of the patent.

It will be obvious that the invention is capable of embodiment in a wide variety of apparatus, using circuits and components of different types in many different ways.

What it is desired to secure by Letters Patent of the United States is:

1. Apparatus for studying particles suspended in a fluid medium having at least one electrical property different than that of the substance or substances of said particles, which comprises: particle scanning means responsive to an electrical current excitation, said scanning means including: structure defining a body of said fluid medium, and providing therein a path for movement of suspended particles and electric current, means for sensing and separately responding to at least primarily resistive and primarily reactive electrical changes in said path, the path being of such small dimensions that the sensing means is capable of sensing electrical changes caused by movement of at least single particles relative to said path; an electrical current excitation source means coupled to said body of fluid and including at least a radio frequency energy source to produce at least a radio frequency field in said path, movement of particles relative to said path modulating said field and each particle producing at least a pair of modulated signals which include components representative primarily of said resistive and reactive electrical changes; and detecting means coupled with the said sensing means for separately responding to said signal components and having a plurality of outputs, at least two of which are arranged to provide output signals related to different physical characteristics of said particles, whereby the different physical characteristics of the particles form a detected basis for particle analysis which can be subject to distinctive accumulating, plotting and the like.

2. Apparatus as claimed in claim 1 in which said detecting means are provided with means for separating the modulated signals into at least two components.

3. Apparatus as claimed in claim 2 in which one of said components is related primarily to said resistive changes, and another of said components is related primarily to said reactive changes, and said separating means includes structure causing each component to produce one output signal on one of said outputs.

4. Apparatus as claimed in claim 1 in which said excitation sorce means has only said radio frequency energy source and the detecting means are provided with signal component separating means for separating the modulated signal components into two parts, and two output signals are produced by said parts, respectively appearing on said outputs.

5. Apparatus as claimed in claim 4 in which one of said parts is related to said primarily resistive changes only, and the other of said parts is related to said primarily reactive changes only.

6. Apparatus as claimed in claim 1 in which said components possess a differing phase relationship and said detecting means include means for separating the modulated signals into two components in accordance with their differing phase relationship and for providing an output signal for each component on a respective one of said outputs.

7. Apparatus as claimed in claim 1 in which said detecting means include two detectors each having said modulated signals as its input and each providing a different signal at its output, one detector being responsive to amplitude modulation primarily, and the other detector being responsive to frequency modulation primarily.

8. Apparatus as claimed in claim 1 in which said detecting means include at least a pair of channels, each channel provides one of said outputs, means are connected with said outputs for computing the difference between output signals appearing respectively on said outputs to produce a difference signal, and at least one of said channels has adjustable signal attenuating means to provide signal discrimination control.

9. Apparatus as claimed in claim 1 in which means are provided for collating output signals on said outputs to obtain at least one resulting signal representative of a relationship between said output signals.

10. Apparatus as claimed in claim 9 in which the means for collating the output signals comprise a computer for subtracting one from the other, whereby the resulting signal comprises a difference signal.

11. Apparatus as claimed in claim 9 in which the collating means is a differential amplifier.

12. Apparatus as claimed in claim 9 in which means are provided to produce an additional signal when said resulting signal meets predetermined amplitude requirements.

13. Apparatus as claimed in claim 12 in which said additional signal is a function of at least one of the signals appearing on said outputs.

14. Apparatus as claimed in claim 1 in which said excitation source means also include a low frequency energy source whereby, each time at least a single particle moves relative to said path there is produced a low frequency signal component which is representative primarily of the size of said particle, and in which said detecting means include signal separating means for separating the low frequency signal component from all other signal components in said detecting means to provide an output signal on one of said outputs related only to said low frequency component.

15. Apparatus as claimed in claim 14, in which said detecting means are provided with means for separating the modulated signals into two of said components, in which one of said components is related primarily to said resistive changes, and the other of said components is related primarily to said reactive changes, and said separating means includes structure causing each component to produce one output signal on a respective one of said outputs.

16. Apparatus as claimed in claim 14 in which said components possess a differing phase relationship and said detecting means include means for separating the modulated signals into two components in accordance with their differing phase relationship and for providing an output signal for each component on a respective one of said outputs.

17. Apparatus as claimed in claim 14 in which said detecting means include two detectors each having said modulated signals as its input and each providing a different signal at its output, one detector being responsive to amplitude modulation primarily, and the other detector being responsive to frequency modulation primarily.

18. Apparatus as claimed in claim 14 in which said detecting means include at least a pair of channels, each channel provides at least one output signal, means are connected with said channels for computing the difference between output signals to produce at least one difference signal, and at least one of said channels has adjustable signal attenuaating means to provide signal discrimination control.

19. Apparatus as claimed in claim 14 in which said signal separating means include one channel having a low frequency demodulator and a second channel having a radio frequency demodulator, and the channels have means for adjusting the relative amplitudes of the output signals from each channel.

20. Apparatus as claimed in claim 19 which includes a pulse ratio computer coupled to receive the output signal from each of said channels to provide a ratio signal output from said computer.

21. Apparatus as claimed in claim 19 which includes a signal comparator coupled to receive the output signals from each of said channels to provide a difference signal output from said comparator.

22. Apparatus as claimed in claim 1 in which said detecting means include two channels, each channel has an input coupled with said sensing means and is connected with one of said outputs to provide one of said output signals, and at least one channel has a demodulator therein.

23. Apparatus as claimed in claim 22 in which said demodulator is sensitive only to the amplitude of said modulated signals.

24. Apparatus as claimed in claim 22 in which there is included phase reference means, said demodulator is amplitude sensitive only to signals bearing a specified phase relationship to said phase reference means, and one of said representative components possesses such phase relationship.

25. Apparatus as claimed in claim 22 in which there is included phase reference means, said demodulator is amplitude insensitive to signals having a specified phase relationship to said phase reference means, and one of said representative components possesses such phase relationship.

26. Apparatus as claimed in claim 22 in which said demodulator is sensitive primarily to phase modulations of said modulated signals.

27. Apparatus as claimed in claim 22 in which said demodulator is sensitive primarily to frequency modulations of said modulated signals.

28. Apparatus as claimed in claim 22 in which each channel has a demodulator therein.

29. Apparatus as claimed in claim 28 in which one of said demodulators is other than amplitude sensitive.

30. Apparatus as claimed in claim 28 in which one of said demodulators is frequency sensitive and the other is amplitude sensitive.

31. Apparatus as claimed in claim 28 in which there are phase reference means connected with at least one of said demodulators, and at least that one said demodulator is phase sensitive.

32. Apparatus as claimed in claim 31 in which said phase reference means are coupled with said radio frequency energy source.

33. Apparatus as claimed in claim 31 in which means are provided to adjust the phase of said excitation source means with respect to said phase reference means.

34. Apparatus as claimed in claim 33 in which said phase adjusting means are in at least one of said channels.

35. Apparatus as claimed in claim 28 in which both said demodulators are coupled with said excitation source means for reference.

36. Apparatus as claimed in claim 1 in which said excitation source means includes two different radio frequency energy sources.

37. Apparatus as claimed in claim 36 in which there are two pairs of outputs, and each pair provides two of said output signals, whereby there can be provided four output signals distinctively derived from said signal components and related to different physical characteristics of said particles.

38. Apparatus as claimed in claim 37 in which means are provided for collating the output signals on said outputs to obtain at least one resulting signal representative of a relationship between at least two of said output signals.

39. Apparatus as claimed in claim 36 in which said excitation source means also includes a low frequency energy source whereby, each time at least a single particle moves relative to said path, there is produced a low frequency signal component which is representative primarily of the size of said particle, and in which said detecting means include signal separating means for separating the low frequency signal component from all other signal components in said detecting means to provide an output signal on one of said outputs related only to said low frequency component.

40. Apparatus as claimed in claim 36 in which said electrical excitation source means has only said two radio frequency sources, the detecting means are provided with signal separating means for separating the modulated signals into two parts, and two of said output signals are be produced by said components, respectively, for each source.

41. Apparatus as claimed in claim 40 in which one of said components is related primarily to said resistive changes, and another of said components is related primarily to said reactive changes, and said separating means includes structure causing two output signals to be produced by said components, respectively, for each source.

42. Apparatus as claimed in claim 36 in which said detecting means are provided with means for separating at least one of said modulated signals into two of said components, one of said components being related primarily to said reactive changes and the other of said components being related primarily to said resistive changes and each component producing one output signal.

43. Apparatus as claimed in claim 36 in which said components possess a differing phase relationship, and said detecting means include means for separating the modulated signal into pairs of components in accordance with their differing phase relationship and frequency of their energy source and for providing an output signal for at least one component.

44. Apparatus as claimed in claim 36 in which said detecting means include at least four channels coupled with said sensing means, each having two outputs to produce two of said output signals, and at least one channel having a demodulator therein.

45. Apparatus as claimed in claim 36 in which said detecting means include a pair of detectors for each frequency, each pair having said modulated signals as its input and one of each pair providing a different signal at its output, one detector of each pair being responsive to amplitude modulation primarily, and the other detector of each pair being responsive to frequency modulation primarily.

46. Apparatus as claimed in claim 36 in which means are provided for collating the output signals on said outputs to obtain at least one resulting signal representative of the relationship between output signals.

47. Apparatus as claimed in claim 36 in which said detecting means include at least a pair of channels, each channel provides one of said outputs, means are connected with said outputs for computing the difference between said output signals to produce a difference signal, and in which said channels have adjustable signal attenuating means to provide signal discrimination control.

48. Apparatus as claimed in claim 36 in which said detecting means include two channels, each channel is associated with a respective one of the radio frequencies, has an input coupled with said sensing means and is connected with one of said outputs to provide one of said output signals, and at least one channel has a demodulator therein.

49. Apparatus as claimed in claim 48 in which said demodulator is sensitive only to the amplitude of said modulated signals.

50. Apparatus as claimed in claim 48 in which there is included phase reference means, said demodulator is amplitude sensitive only to signals bearing a specified relationship to said phase reference means, and one of said representative components possesses such phase relationship.

51. Apparatus as claimed in claim 48 in which there is included phase reference means, said demodulator is amplitude insensitive to signals bearing a specified phase relaitonship to said phase reference means, and one of said representative components possesses such phase relationship.

52. Apparatus as claimed in claim 48 in which said demodulator is sensitive primarily to phase modulations of the modulated signals.

53. Apparatus as claimed in claim 48 in which said demodulator is sensitive primarily to frequency modulations of the modulated signals.

54. Apparatus as claimed in claim 48 in which both channels have demodulators therein.

55. Apparatus as claimed in claim 54 in which one of said demodulators is other than amplitude sensitive.

56. Apparatus as claimed in claim 54 in which one of said demodulators is frequency sensitive and one of said demodulators is amplitude sensitive.

57. Apparatus as claimed in claim 54 in which there are phase reference means connected with at least one of said demodulators, and at least one said demodulator is phase sensitive.

58. Apparatus as claimed in claim 57 in which said phase reference means are coupled with one of said radio frequency energy sources for any such demodulator.

59. Apparatus as claimed in claim 54 in which said demodulators are both phase sensitive and means are provided to adjust the phase of one with respect to the other.

60. Apparatus as claimed in claim 59 in which said phase adjusting means is in at least one channel.

61. Apparatus as claimed in claim 60 in which both said demodulators are coupled with said excitation source means for reference.

62. In a particle study apparatus, a particle sensing zone defined by a path of small dimension for movement therethrough of particles suspended in a fluid medium and an electric current, said particles having at least one electrical property different from the electrical properties of said fluid, an electrical energy source of at least two different frequencies coupled with said path to energize said sensing zone and establish therein an electrical field having energy at both of said frequencies, each particle, during movement through said path, interacting with said field to produce a pair of modulated signals, one of said pair for each of the respective different frequencies in said field, detecting and demodulating means coupled with said path and responsive to said modulated signals to demodulate and detect the same and provide output signals related to said interacting of each particle for the respective different frequencies, and means for comparing a common parameter of said output signals.

63. Apparatus as claimed in claim 62 in which the particles to be studied possess an outer shell which becomes electrically transparent to field energy within a particular frequency range and said electrical energy source is constructed to provide field energy within said particular frequency range, whereby the interacting with said field will be due substantially to electrically responsive properties of the physical contents of said particles and differences in the contents of the particles are made detectable.

64. Apparatus for studying particles suspended in a fluid medium having at least one electrical property different from that of the substance or substances of said particles, which comprises: particle scanning means responsive to an electrical current excitation, structure defining a body of said fluid medium and providing therein a path for movement of suspended particles and electric current, means for sensing and separately responding to electrical changes in said path, the path being of such small dimensions that the sensing means is capable of sensing electrical changes caused by movement of at least single particles relative to said path, an electrical current excitation source means coupled to said body of fluid and including an energy source of at least one frequency which produces an electrical field of related frequency in said path, said field being modulated by movement of particles relative to said path and each particle producing at least one modulated signal which includes components representative of said electrical changes, and detecting means coupled with said sensing means for separately responding to said signal components and having a plurality of outputs, at least two of said outputs arranged to provide output signals related to different physical characteristics of said particles, whereby the different physical characteristics of the particles form a detected basis for particle analysis which can be subject to distinctive accumulating, plotting and the like.

65. Apparatus as claimed in claim 64 in which said excitation source means includes an electrical energy source of at least two different frequencies to establish in said electrical field energy at both of said frequencies, each particle, during movement through said path, interacting with said field to produce a pair of modulated signals, one of said pair for each of the respective different frequencies in said field, and said detecting means being responsive to said modulated signals to provide output signals related to said interacting of each particle for the respective different frequencies.

66. Apparatus as claimed in claim 65 in which said excitation source means includes a low frequency energy source whereby, each time at least a single particle moves relative to said path, there is produced a low frequency signal component which is representative primarily of the size of said particle, and in which said detecting means include signal separating means for separating the low frequency signal component from all other signal components in said detecting means, to provide an output signal on one of said outputs related only to said low frequency component.

References Cited

UNITED STATES PATENTS

| | | | |
|---|---|---|---|
| 2,968,180 | 1/1961 | Schafer | 324—61 XR |
| 2,972,106 | 2/1961 | Hyrne | 324—57 |
| 3,114,257 | 12/1963 | Foster et al. | 324—61 XR |
| 3,155,900 | 11/1964 | Hanken | 324—61 |
| 3,155,902 | 11/1964 | Walls | 324—61 |
| 3,231,815 | 1/1966 | Spencer | 324—61 |
| 3,249,865 | 5/1966 | Hanken | 324—61 |
| 3,323,047 | 5/1967 | Martin et al. | 324—61 |

FOREIGN PATENTS

| | | |
|---|---|---|
| 797,399 | 7/1958 | Great Britain. |

EDWARD E. KUBASIEWICZ, Primary Examiner

PO-1050
(5/69)

UNITED STATES PATENT OFFICE
CERTIFICATE OF CORRECTION

Patent No. 3,502,974 Dated March 24, 1970

Inventor(s) Wallace H. Coulter and Walter R. Hogg

It is certified that error appears in the above-identified patent and that said Letters Patent are hereby corrected as shown below:

Column 1, line 7, change "Hogo" to read --Hogg--. Column 3, line 20, after "properties" should be inserted --or characteristics--. Column 9, line 26, "are" should be --art--. Column 14, line 54, "stead" should be --steady--. Column 18, line 64, "pulse corresponding" should be --corresponding pulse--. Column 20, lines 39 and 40, "the volume of which represents the amplitude" should be --the amplitude of which represents the volume--. Column 22, line 27, "advertising" should be --adverting--. Column 23, line 57, "amplifier" should be --amplifiers--. Column 31, line 49, before "relationship" insert --phase--.

SIGNED AND SEALED
NOV 24 1970

(SEAL)
Attest:

Edward M. Fletcher, Jr.
Attesting Officer

WILLIAM E. SCHUYLER, JR.
Commissioner of Patents